(12) United States Patent
Fukumura

(10) Patent No.: US 10,556,230 B2
(45) Date of Patent: Feb. 11, 2020

(54) PHOTOCATALYST COATING

(71) Applicant: NITTO DENKO CORPORATION, Osaka (JP)

(72) Inventor: Takuya Fukumura, Osaka (JP)

(73) Assignee: Nitto Denko Corporation, Osaka (JP)

( * ) Notice: Subject to any disclaimer, the term of this patent is extended or adjusted under 35 U.S.C. 154(b) by 3 days.

(21) Appl. No.: 15/578,132

(22) PCT Filed: May 27, 2016

(86) PCT No.: PCT/JP2016/002601
§ 371 (c)(1),
(2) Date: Nov. 29, 2017

(87) PCT Pub. No.: WO2016/194354
PCT Pub. Date: Dec. 8, 2016

(65) Prior Publication Data
US 2018/0147572 A1 May 31, 2018

Related U.S. Application Data

(60) Provisional application No. 62/168,210, filed on May 29, 2015.

(51) Int. Cl.
*B01J 20/32* (2006.01)
*B01J 23/10* (2006.01)
(Continued)

(52) U.S. Cl.
CPC ........ *B01J 35/004* (2013.01); *B01D 53/8681* (2013.01); *B01D 53/8684* (2013.01); *B01D 53/88* (2013.01); *B01J 20/3204* (2013.01); *B01J 20/3214* (2013.01); *B01J 20/3236* (2013.01); *B01J 23/10* (2013.01); *B01J 23/30* (2013.01); *B01D 2253/102* (2013.01);
(Continued)

(58) Field of Classification Search
CPC ................ B01J 20/3204; B01J 20/3214; B01J 20/3236; B01J 23/10; B01J 23/30; B01J 35/004
See application file for complete search history.

(56) References Cited

U.S. PATENT DOCUMENTS

| | | | | |
|---|---|---|---|---|
| 5,547,823 A | * | 8/1996 | Murasawa | ............. B01J 35/002 204/155 |
| 7,348,288 B1 | * | 3/2008 | Kittrell | ............. B01D 53/8662 502/102 |

(Continued)

FOREIGN PATENT DOCUMENTS

| | | |
|---|---|---|
| CN | 1208670 A | 2/1999 |
| CN | 104487166 | 4/2015 |

(Continued)

OTHER PUBLICATIONS

International Search Report for PCT/JP2016002601, dated Sep. 8, 2016.

(Continued)

*Primary Examiner* — Cam N. Nguyen
(74) *Attorney, Agent, or Firm* — K&L Gates LLP; Louis C. Cullman; Hal Gibson

(57) ABSTRACT

The present invention provides a photocatalytic composition comprising: a photocatalyst; and an adsorbent material.

16 Claims, 7 Drawing Sheets

(51) Int. Cl.
  *B01J 23/30* (2006.01)
  *B01J 35/00* (2006.01)
  *B01D 53/86* (2006.01)
  *B01D 53/88* (2006.01)

(52) U.S. Cl.
  CPC .... *B01D 2253/104* (2013.01); *B01D 2255/10* (2013.01); *B01D 2255/2065* (2013.01); *B01D 2255/20715* (2013.01); *B01D 2255/20776* (2013.01); *B01D 2255/802* (2013.01)

(56) References Cited

U.S. PATENT DOCUMENTS

| | | | |
|---|---|---|---|
| 7,449,245 B2 * | 11/2008 | Akarsu | B01J 35/004 428/312.2 |
| 7,754,648 B2 * | 7/2010 | Tsujmichi | B01J 21/06 502/263 |
| 7,862,910 B2 * | 1/2011 | Krisko | B01J 35/004 428/432 |
| 7,919,425 B2 * | 4/2011 | Omoshiki | B01J 21/063 502/159 |
| 8,207,079 B2 * | 6/2012 | Kitazaki | B01J 21/063 502/159 |
| 9,321,034 B2 * | 4/2016 | Nakano | A61L 2/232 |
| 9,587,877 B2 | 3/2017 | Ozaki | |
| 9,987,621 B2 * | 6/2018 | Fukumura | B01J 27/24 |
| 2008/0241542 A1 | 10/2008 | Ohtani | |
| 2010/0292075 A1 | 11/2010 | Nakano | |
| 2013/0180932 A1 | 7/2013 | Fukumura | |
| 2016/0129432 A1 * | 5/2016 | Ozaki | B01J 23/30 423/245.1 |
| 2016/0158738 A1 * | 6/2016 | Ozaki | B01J 35/02 502/159 |
| 2016/0161178 A1 | 6/2016 | Ozaki | |
| 2017/0291164 A1 | 10/2017 | Zhang | |

FOREIGN PATENT DOCUMENTS

| | | | |
|---|---|---|---|
| DE | 4023995 | A1 | 1/1992 |
| EP | 2248586 | A1 | 10/2010 |
| EP | 3021640 | A1 | 5/2016 |
| JP | 2001162176 | A | 6/2001 |
| JP | 2005163243 | A | 6/2005 |
| JP | 2006289315 | A | 10/2006 |
| JP | 2009202152 | A | 10/2009 |
| JP | 2011-200774 | A | 10/2011 |
| JP | 2014184436 | A | 2/2014 |
| JP | 2014198338 | A | 10/2014 |
| JP | 2015005346 | A | 1/2015 |
| JP | 2015513306 | A | 5/2015 |
| KR | 10-2014-0122720 | A | 10/2014 |
| TW | 200940168 | A | 10/2009 |
| TW | 201332649 | A | 8/2013 |
| TW | 201507234 | A | 2/2015 |
| WO | 2009096177 | A1 | 8/2009 |
| WO | 2013106776 | A2 | 7/2013 |
| WO | 2015005346 | A1 | 1/2015 |

OTHER PUBLICATIONS

Ryu Abe et al., Pristine Simple Oxide as Visible Light Driven Photocatalysts: Highly Efficient Decomposition of Organic Compounds over Platinum-Loaded Tungsten Oxide, 130 Am. Chem. Soc. 7780 (2008).

R. Asahi et al., Visible-Light Photocatalysts in Nitrogen-Doped Titanium Oxides, 293(5528) Sci. 269 (Jul. 13, 2001).

Min Liu et al., Cu(II) Oxide Amorphous Nanoclusters Grafted Ti3+ Self-doped TiO2: An Efficient Visible Light Photocatalyst, 23 Chem. Mater. 5282 (Nov. 8, 2011).

Extended European Search Report dated Jan. 25, 2019 for European Application Serial No. 16802796.9.

Chinese Office Action, dated Oct. 28, 2019, for corresponding Chinese Patent Application No. 201680030867.9 (Original and English Translation Provided).

* cited by examiner

[Fig. 1A]
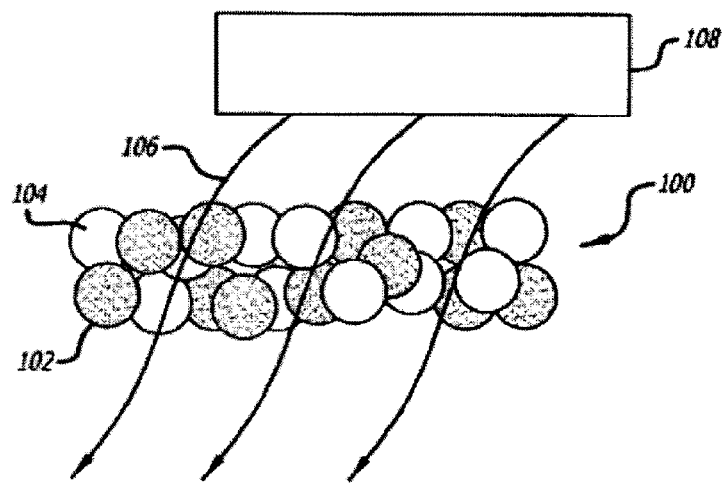
[Fig. 1B]
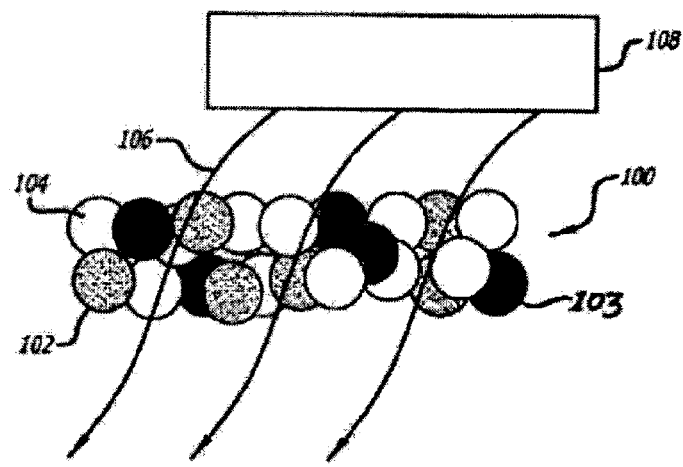
[Fig. 2A]
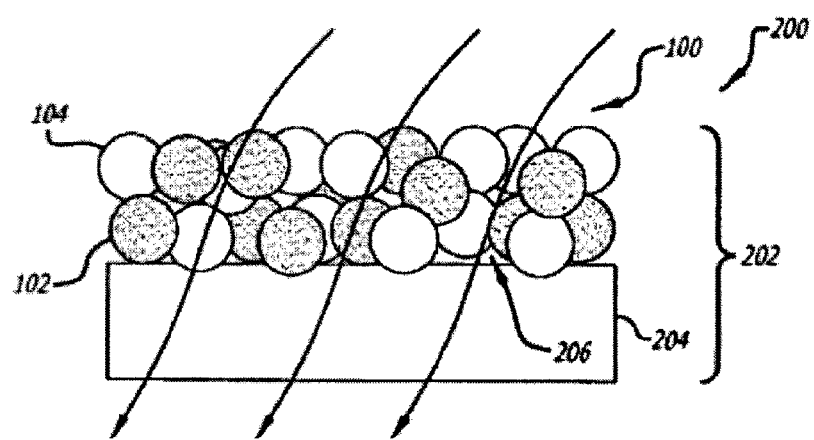

[Fig. 2B]
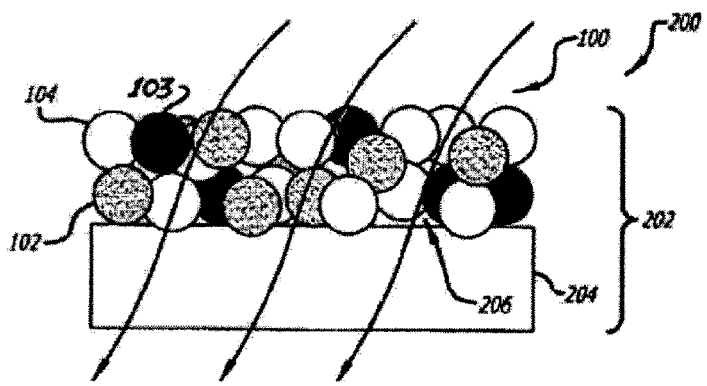
[Fig. 3]
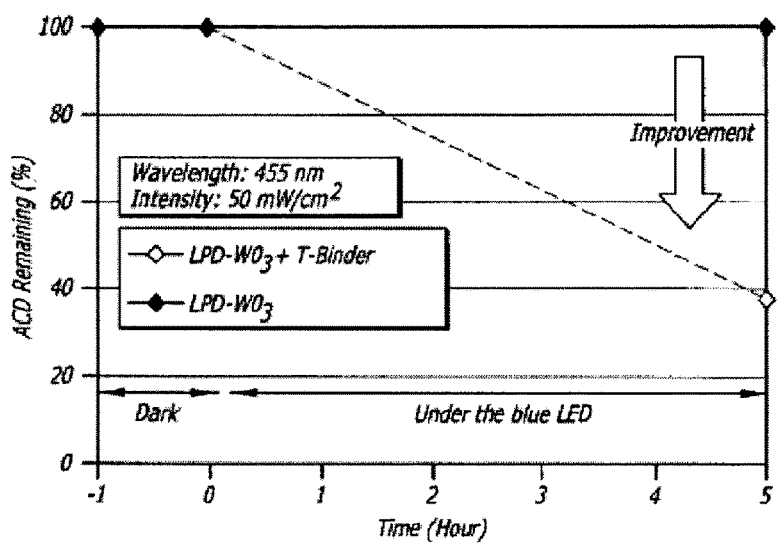
[Fig. 4]
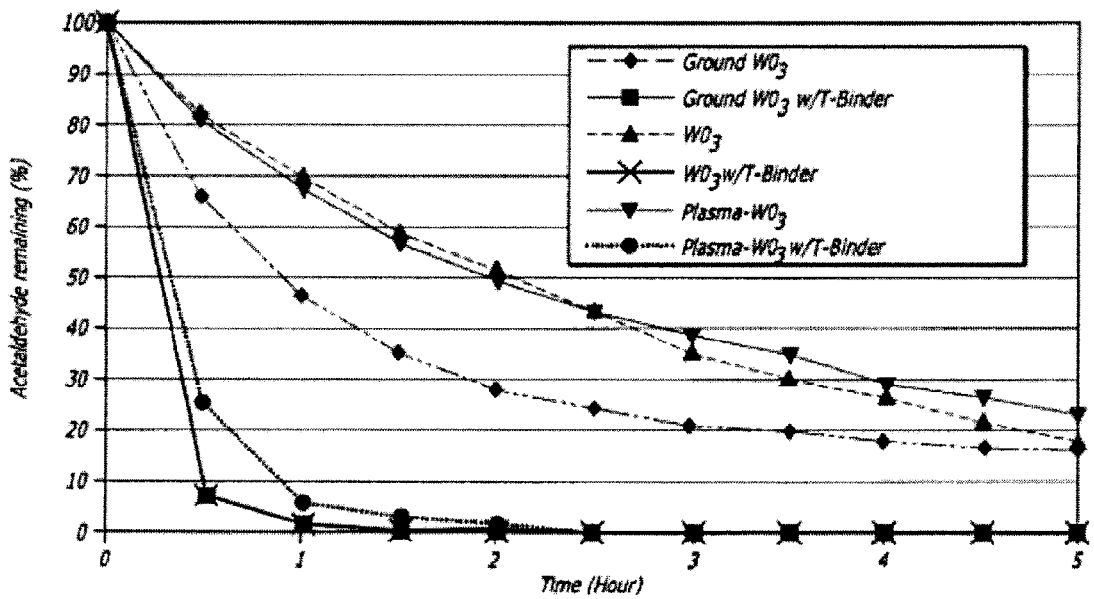

[Fig. 5]
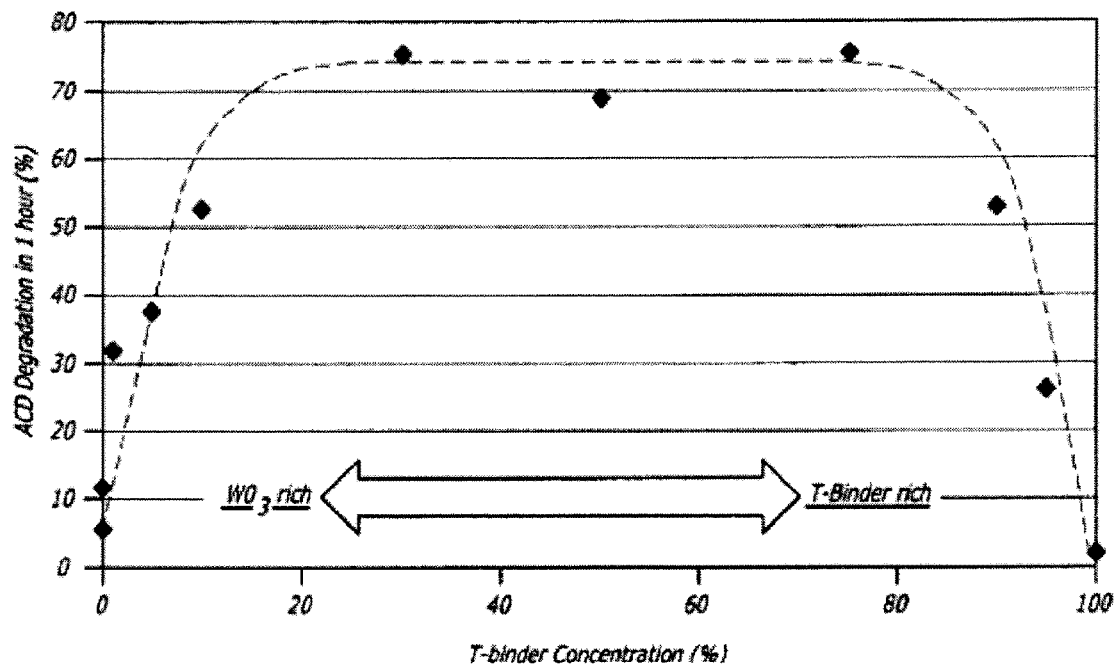
[Fig. 6]
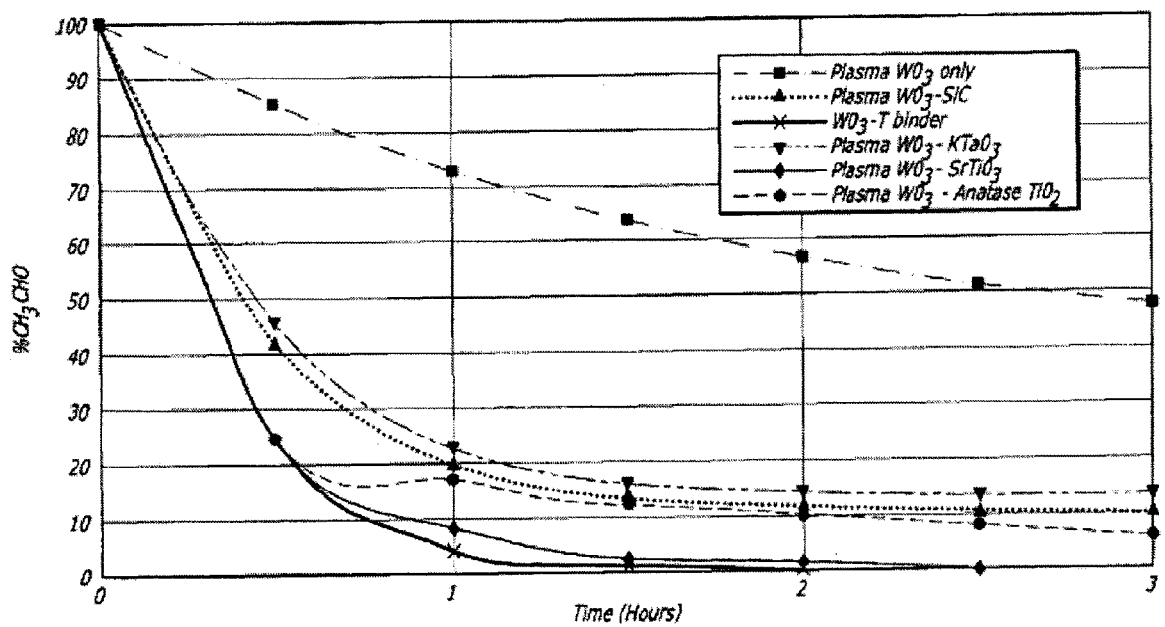

[Fig. 7]
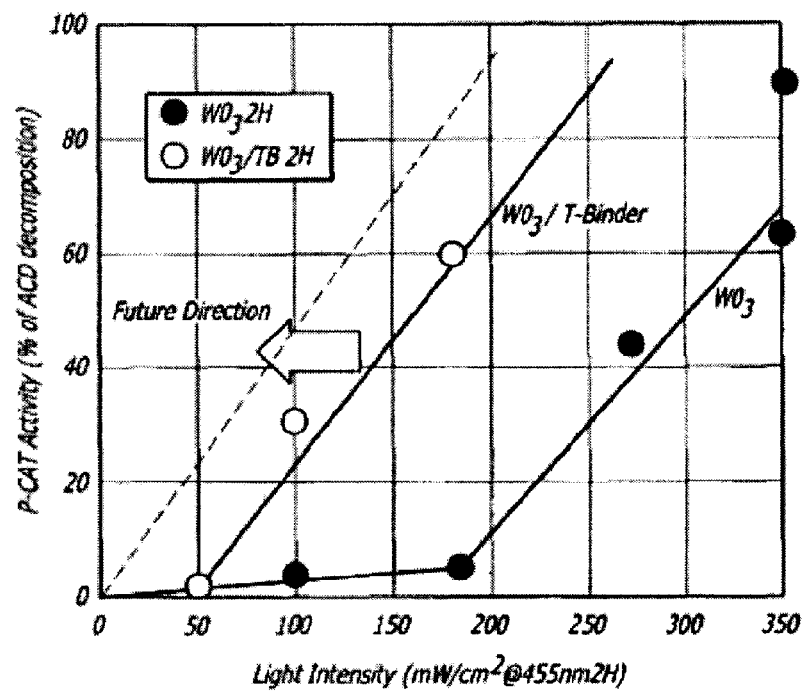

[Fig. 8]
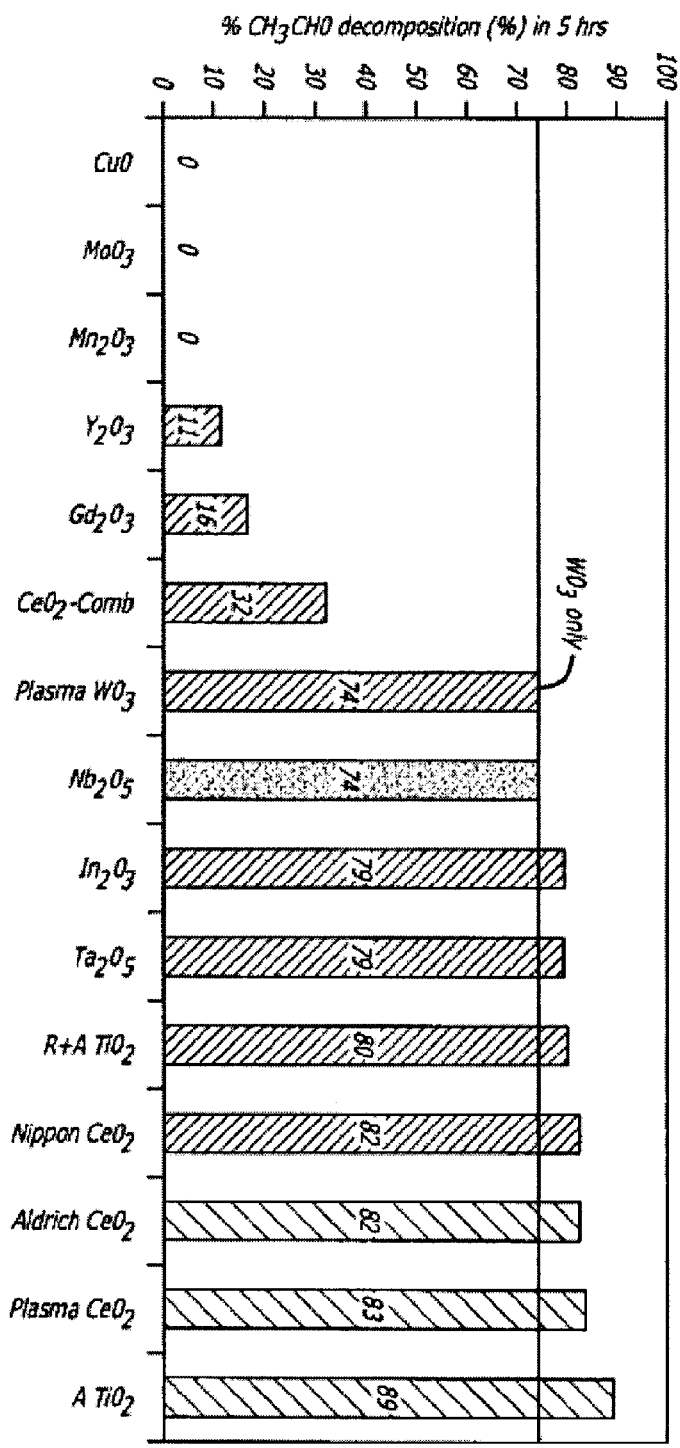

[Fig. 9]
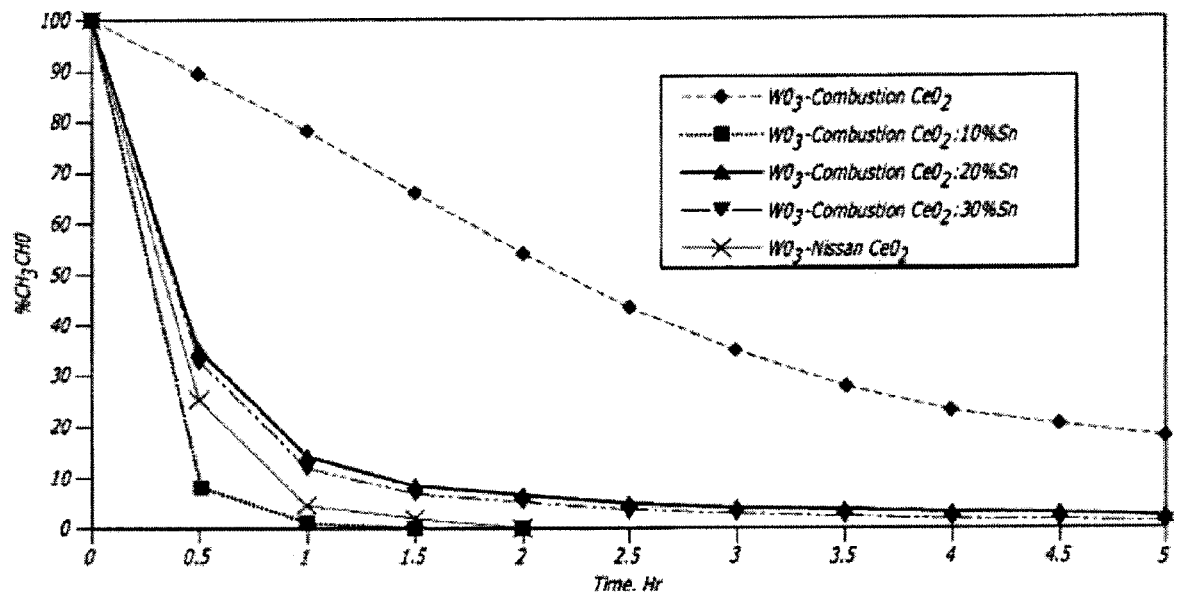
[Fig. 10]
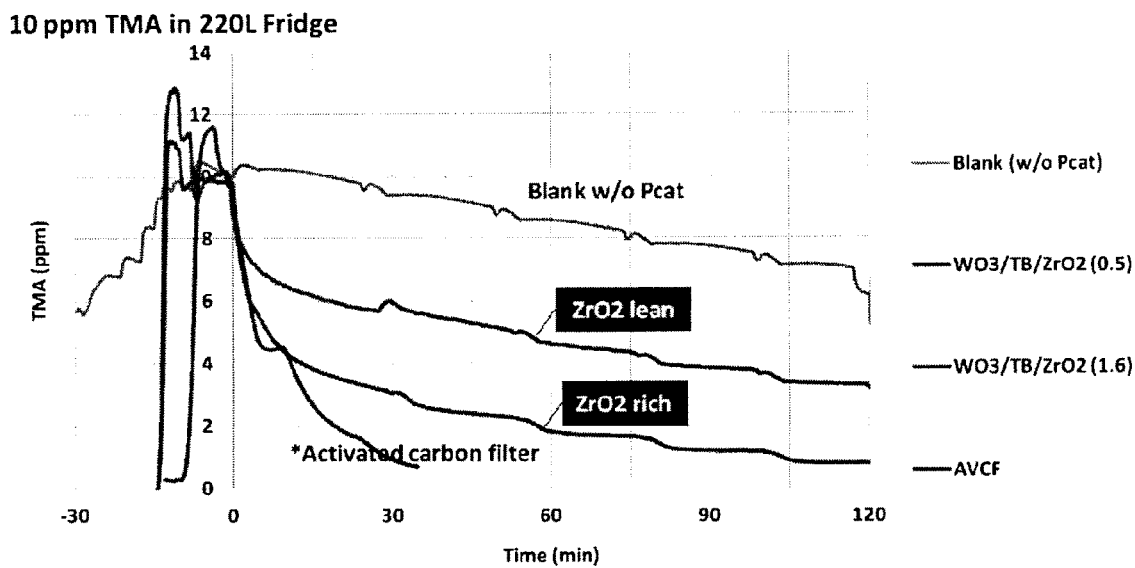

[Fig. 11]
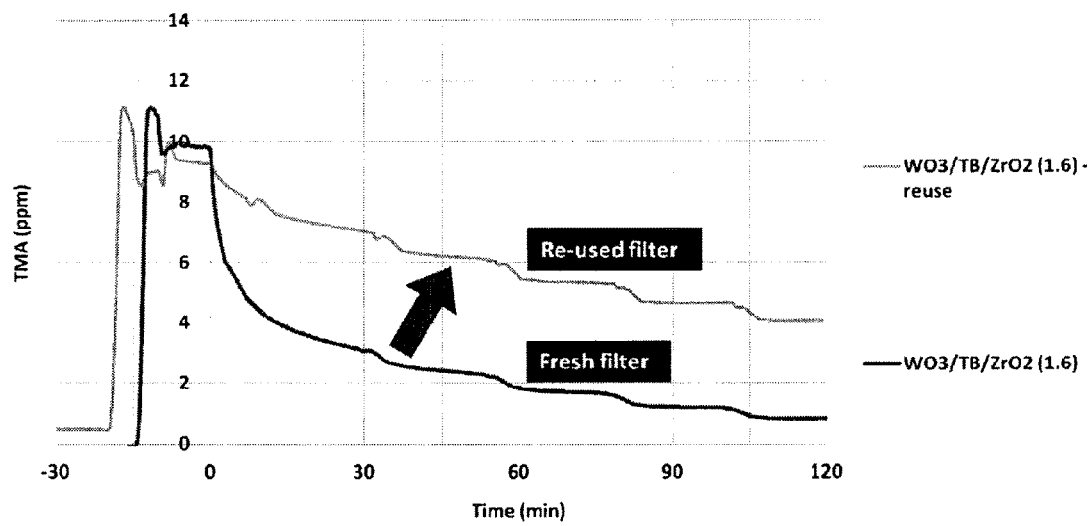
[Fig. 12]
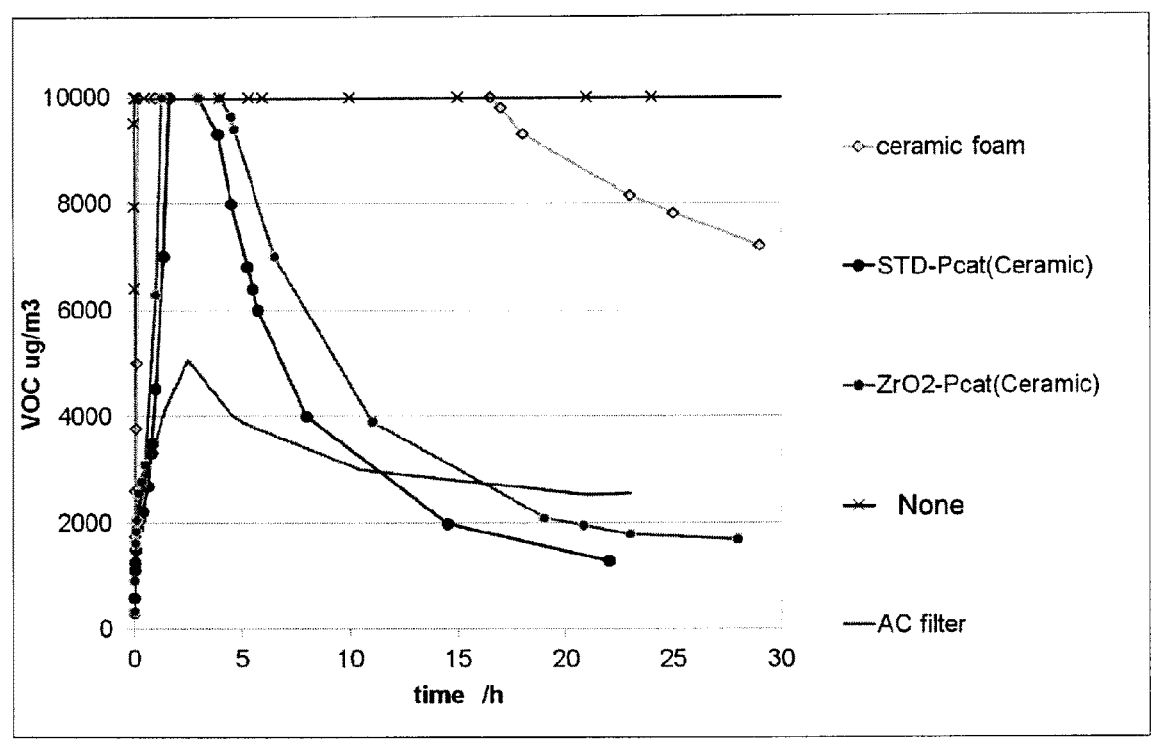

PHOTOCATALYST COATING

CROSS REFERENCE TO RELATED APPLICATIONS

This application is the U.S. national phase of PCT Application No. PCT/JP2016/002601, filed May 27, 2016, which claims the benefit of U.S. Provisional Application No. 62/168,210, filed May 29, 2015. The contents of each of these applications are hereby incorporated herein in their entirety.

TECHNICAL FIELD

These embodiments relate to photocatalytic compounds. Other embodiments relate to photocatalytic compounds with adsorbent constituents.

BACKGROUND ART

Visible-light activated photocatalysts can be deployed for self-cleaning, air and water purification and many other interesting applications usually without any post-deployment non-renewable energy costs. This is because the photocatalysts are able to decompose pollutants (like dyes, volatile organic compounds and $NO_x$) using available ambient light like solar radiation or indoor and outdoor lighting. With the anticipated rapid adoption of UV-free indoor lighting (like LEDs and OLEDs), it is imperative to find ways to deploy visible-light activated photocatalysts in indoor applications for instance in cleaning room air in domestic, public and commercial spaces especially in confined spaces like aircrafts, public buildings, etc. Moreover, additional applications for antibacterial surfaces and self-cleaning materials can have wide applicability in the food service, transportation, health care and hospitality sectors.

Generally, photocatalytic coatings exhibit low photocatalytic activity, primarily due to low inherent activity of the base photocatalyst material as well as their incompatibility with the often used binders. Thus, there is a need for photocatalytic coatings and/or layers that exhibit desired photocatalytic levels and transparency.

SUMMARY OF INVENTION

Photocatalytic compositions that include a photocatalyst, a co-catalyst, and an adsorbent material may be useful for a variety of photocatalytic applications. Additionally, a co-catalyst may improve the photocatalytic activity of a photocatalyst, so that combination of a photocatalyst and a co-catalyst is more active than a photocatalyst alone. Furthermore, incorporation of co-catalysts into photocatalytic coatings may help to improve the transparency and photocatalytic activity of the coating material. Additionally, an adsorbent may improve the photocatalytic activity against trimethylamine.

In some embodiments, a photocatalytic composition is described, the photocatalytic composition comprising a photocatalyst and an adsorbent material. In some embodiments, the adsorbent material comprises solid acid and/or solid base. In some embodiment, the solid acid comprises $ZrO_2$. In some embodiment, the solid base comprises activated carbon and/or $Al_2O_3$. In some embodiments, the adsorbent material comprises at least one of $ZrO_2$, activated carbon and $Al_2O_3$. In some embodiments, the photocatalytic composition can further comprise a co-catalyst. In some embodiments, the photocatalyst can comprise $WO_3$. In some embodiments, the co-catalyst can comprise $ZrO_2$ and/or $CeO_2$. In some embodiments, the co-catalyst can comprise cerium. In some embodiments, the co-catalyst can comprise $CeO_2$. In some embodiments, the photocatalyst can be doped with at least one naturally occurring element. In some embodiments, the photocatalyst can be loaded with a transition metal, a transition metal oxide, and/or a transition metal hydroxide. In some embodiments, the transition metal can be Cu, Fe, and/or Ni. In some embodiments, the photocatalyst can be loaded with a noble metal, a noble metal oxide, and/or a noble metal hydroxide. In some embodiments, the noble metal can be Au, Ag, Pt, Pd, Ir, Ru, and/or Rh. In some embodiments, the co-catalyst can comprise a binder. In some embodiments, the composition can be capable of photocatalytically removing, adhering to and/or decomposing trimethylamine. In some embodiments, the adsorbent material can be a trimethylamine adsorbent material. In some embodiments, the absorbent material can be activated carbon and/or Zr oxide. In some embodiments, a photocatalytic layer is described, the photocatalytic layer can comprise any or all of the photocatalytic compositions described above. In some embodiments, the photocatalytic layer can further comprise a substrate, wherein at least a portion of the photocatalytic composition contacts the substrate surface. In some embodiments, a use of the above-mentioned photocatalytic composition, or the above-mentioned photocatalytic layer is described, wherein the photocatalytic composition or the photocatalytic layer is used for removing basic gas and/or acidic gas. In some embodiments, the basic gas comprises trymethylamine. In some embodiments, the acidic gas comprises acetic acid.

In some embodiments, a method of making a photocatalytic layer is described, the method can comprise forming a composition described above, and applying the composition to a substrate. In some embodiments, a method for making a photocatalytic layer is described, the method comprising creating a dispersion comprising a photocatalyst, $CeO_2$, and a dispersing media, molar ratio of the photocatalyst to $CeO_2$ to adsorbent being between 20-50 molar % photocatalyst and 20-50 molar % $CeO_2$ and 5-60 molar % adsorbent material; applying the dispersion to a substrate; and heating the dispersion and the substrate at a sufficient temperature and length of time to evaporate substantially all the dispersing media from the dispersion. In some embodiments, the molar ratio of photocatalyst to $CeO_2$ to adsorbent is about 1:1:0.25 to about 1:1:2.

In some embodiments, a method of making a photocatalytic layer is described, the method can comprise forming a composition described above, and applying the composition to a substrate. In some embodiments, a method for making a photocatalytic layer is described, the method comprising creating a dispersion comprising a photocatalyst, $ZrO_2$ and a dispersing media, molar ratio of the photocatalyst to adsorbent being between 20-80 molar % photocatalyst and 80-20 molar % adsorbent material; applying the dispersion to a substrate; and heating the dispersion and the substrate at a sufficient temperature and length of time to evaporate substantially all the dispersing media from the dispersion. In some embodiments, the molar ratio of photocatalyst to adsorbent is about 1:1 to about 1:4. In some embodiments, a self cleaning material is described, the self cleaning material can comprise a photocatalytic composition described herein. In some embodiments, a method is described, wherein the photocatalytic composition can be applied to glass, wallboards, stone, masonry, metals, woods, plastics, other polymeric surfaces, concrete, fibers, textiles, yarns, or ceramics. In some embodiments, the photocatalytic composition can be applied by vapor deposition, chemical vapor deposition, physical vapor deposition, laminating, pressing, rolling, soaking, melting, gluing, sol-gel deposition, spin coating, dip coating, bar coating, brushing coating, sputtering, thermal spraying, flame spray, plasma spray, high velocity oxy-fuel spray, atomic layer deposition, cold spraying, and/or aerosol deposition.

These and other embodiments are described in more detail herein.

BRIEF DESCRIPTION OF DRAWINGS

FIG. 1A is a schematic depiction of an embodiment of a photocatalytic coating.

FIG. 1B is a schematic depiction of another embodiment of a photocatalytic coating.

FIG. 2A is a schematic depiction of an embodiment of a photocatalytic coated surface.

FIG. 2B is a schematic depiction of another embodiment of a photocatalytic coated surface.

FIG. 3 is a graph illustrating T-binder performance data.

FIG. 4 is a plot of acetaldehyde decomposition for the photocatalytic compositions of Examples 5-7.

FIG. 5 is a plot of acetaldehyde decomposition at one hour for a photocatalytic composition comprising $WO_3$ and T-binder at various ratios.

FIG. 6 is a plot of acetaldehyde decomposition for the photocatalytic compositions of Examples 9-15.

FIG. 7 is a plot of acetaldehyde decomposition for $WO_3$ and $WO_3$/T-Binder at varying light intensity at 455 nm.

FIG. 8 is a graph of acetaldehyde decomposition after 5 hours for $WO_3$ with co-catalysts of Examples 16-30 at a 1:1 molar ratio.

FIG. 9 is a plot of acetaldehyde decomposition for the photocatalytic compositions of Examples 31-35.

FIG. 10 is a plot of trimethylamine removal for the photocatalytic compositions of Examples 37-38.

FIG. 11 is a plot of trimethylamine removal for the photocatalytic compositions of Examples 37-38.

FIG. 12 is a graph showing vinegar odor removal results using variety of filters.

DESCRIPTION OF EMBODIMENTS

The term adsorption refers to a surface phenomenon wherein the atoms, ions or molecules from a gas, liquid or dissolved solid adhere to a surface. This process differs from absorption, in which a fluid (the absorbate) permeates or is dissolved by a liquid or solid (the absorbent). Adsorption is a surface-based process while absorption involves the whole volume of the material.

The term adsorbate refers to a thin film or structure of adhered atoms, ion or molecules to the surface.

The term adsorbent refers to the substrate upon which the adsorbate is disposed.

The term desorption refers to the release of the adsorbed material to the substrate surface.

The term trimethylamine refers to a compound including the structure shown below.

Chemical Formula I

In some embodiments, a photocatalytic composition is described, the photocatalytic composition comprising a photocatalyst and an adsorbent material. In some embodiments, the adsorbent material comprises solid acid and/or solid base. In some embodiment, the solid acid comprises $ZrO_2$. In some embodiment, the solid base comprises activated carbon and/or $Al_2O_3$. In some embodiments, the adsorbent material comprises at least one of $ZrO_2$, activated carbon and $Al_2O_3$. In some embodiments, the composition adsorbs the trimethylamine. In some embodiments, the composition photocatalytically decomposes the trimethylamine. In some embodiments, the composition both adsorbs and photocatalytically decomposes trimethylamine. In some embodiments, the photocatalytic composition further includes a co-catalyst material. In some embodiments, the adsorbent material and the co-catalyst material can be the same material. In some embodiments, the adsorbent material and the co-catalyst material can be the different materials. In some embodiments, the adsorbent material can be a trimethylamine adsorbent material. In some embodiments, the absorbent material can be activated carbon and/or Zr oxide. In some embodiments, the zirconium oxide can be $ZrO_2$ (zirconium dioxide). In some embodiments, the zirconium oxide can be monoclinic phase zirconium oxide. In some embodiments, the zirconium oxide can be substantially all monoclinic phase zirconium oxide. In some embodiments, the zirconium oxide can be a mixture of monoclinic phase zirconium oxide and other phase zirconium oxide. In some embodiments, the mixture can be at least 90%, 75% and/or 50% monoclinic phase zirconium oxide.

A photocatalyst includes any material that can activate or change the rate of a chemical reaction as a result of exposure to light, such as ultraviolet or visible light. In some embodiments, photocatalyst material may be an inorganic solid, such as a solid inorganic semiconductor, that absorbs ultraviolet or visible light. For some materials, photocatalysis may be due to reactive species (able to perform reduction and oxidation) being formed on the surface of the photocatalyst from the electron-hole pairs generated in the bulk of the photocatalyst by said absorption of electromagnetic radiation. In some embodiments, the photocatalyst has a conduction with an energy of about 1 eV to about 0 eV, about 0 eV to about −1 eV, or about −1 eV to about −2 eV, as compared to the normal hydrogen electrode. Some photocatalyst may have a valence band with energy of about 3 eV to about 3.5 eV, about 2.5 eV to about 3 eV, or about 2 eV to about 3.5 eV, or about 3.5 eV to about 5.0 eV as compared to the normal hydrogen electrode.

Traditionally, photocatalysts could be activated only by light in the UV regime i.e. wavelength less than 380 nm. This is because of the wide bandgap (>3 eV) of most semiconductors. However, in recent years by appropriately selecting materials or modifying existing photocatalysts, visible light photocatalysts have been synthesized (Asahi et al., Science, 293: 269-271, 2001 and Abe et al., Journal of the American Chemical Society, 130(25): 7780-7781, 2008). A visible light photocatalyst includes a photocatalyst which is activated by visible light, e.g. light that is normally visually detectable by the unaided human eye, such as at least about 380 nm in wavelength. Visible light photocatalysts can also be activated by UV light below 380 nm in wavelength in addition to visible wavelengths. Some visible light photocatalyst may have a band gap that corresponds to light in the visible range, such as a band gap greater than about 1.5 eV, less than about 3.5 eV, about 1.5 eV to about 3.5 eV, about 1.7 eV to about 3.3 eV, or 1.77 eV to 3.27 eV.

Some photocatalyst may have a band gap of about 1.2 eV to about 6.2 eV, about 1.2 eV to about 1.5 eV, or about 3.5 eV to about 6.2 eV.

Some photocatalysts include oxide semiconductors such as $TiO_2$, $WO_3$, etc., and modifications thereof. Contemplated modifications include doping and/or loading. Photocatalysts can be synthesized by those skilled in the art by a variety of methods including solid state reaction, combustion, solvothermal synthesis, flame pyrolysis, plasma synthesis, chemical vapor deposition, physical vapor deposition, ball milling, and high energy grinding.

In some embodiments, the photocatalyst can be an oxide semiconductor. In some embodiments, the photocatalyst can be a titanium (Ti) compound, such as a titanium oxide, oxycarbide, oxynitride, oxyhalide, or halide, including a titanium compound or oxide having a +1, +2, +3, +4, +5, or +6 oxidation state or formal charge, or an average oxidation state or formal charge of about +1 to about +6, about +2 to about +4, about +1 to about +2, or about +4 to about +6.

In some embodiments, the photocatalyst can be a tungsten (W) compound, such as a tungsten oxide, oxycarbide, oxynitride, oxyhalide, or halide, including a tungsten compound or oxide having a +1, +2, +3, +4, +5, +6, +7, or +8 oxidation state or formal charge, or an average oxidation state or formal charge of about +1 to about +8, about +4 to about +8, about +6 to about +8, or about +1 to about +4.

In some embodiments, the respective Ti or W compounds can be a respective oxide, oxycarbide, oxynitride, oxyhalide, halide, salt, doped or loaded compound. In some embodiments, the respective Ti or W compounds can be $TiO_2$, $WO_3$, and/or $Ti(O,C,N)_2$:Sn, such as $Ti(O,C,N)_2$:Sn wherein the molar ratio of Ti:Sn is about 90:10 to about 80:20, about 85:15 to about 90:10, or about 87:13. In some embodiments, the respective Ti or W compounds can be nanopowders, nanoparticles, and or layers comprising the same. In some embodiments, the photocatalyst comprises at least $WO_3$. In some embodiments, the photocatalyst can comprise $TiO_2$. In some embodiments, the photocatalyst can comprise anatase $TiO_2$. In some embodiments, the photocatalyst does not include $TiO_x$. In some embodiments, the photocatalyst does not include $TiO_2$.

Any useful amount of photocatalyst may be used. In some embodiments, the photocatalyst material is at least about 0.01 molar % and less than 100 molar % of the composition. In some embodiments, the photocatalyst material is about 20 molar % to about 80 molar %, about 30 molar % to about 70 molar %, about 40 molar % to about 60 molar %, or about 50 molar % of the composition. In some embodiments, the photocatalyst material is about 50 molar % to about 95 molar %, about 20 molar % to about 55 molar %, about 25 molar % to about 50 molar %, e.g., about 40 molar % (1:1:0.5 molar ratio) and/or about 28% (1:1:1.6 molar ratio) of the composition. In some embodiments, the photocatalyst material is about 20 molar % to about 95 molar %, about 30 molar % to about 70 molar %, about 40 molar % to about 60 molar %, e.g., about 80 molar % (1 molar+1 molar: 0.5 molar) and/or 56 molar % of the composition (1 molar+1 molar: 1.6 molar). In some embodiments, the photocatalyst material is about 20 molar % to about 50 molar %, about 30 molar % to about 40 molar %, e.g., about 35 molar % of the composition (1 molar: 1.88 molar).

$TiO_2$ and $WO_3$ compounds, e.g., nanopowders, can be prepared by many different methods including thermal plasma (direct current and including radio frequency inductively-coupled plasma (RF-ICP)), solvothermal, solid state reaction, pyrolysis (spray and flame), and combustion. Radio frequency inductively-coupled plasma (e.g. thermal) methods as described in U.S. Pat. No. 8,003,563, which is included herein its entirety by reference, may be useful because of low contamination (no electrodes) and high production rates and facile application of precursors either in the gas, liquid or solid form. Hence, radio frequency inductively-coupled plasma processes are preferred. For example, when preparing $WO_3$ nanopowders, a liquid dispersion of ammonium metatungstate in water (5-20 wt % solid in water) can be sprayed into the plasma volume using a two-fluid atomizer. Preferably, the precursor can be present to about 20 wt % solid in water. The plasma can be operated at about 25 kW plate power with argon, nitrogen and/or oxygen gases. The particles formed from the condensed vapor from the plasma can then be collected on filters. In some embodiments, the particle surface areas range as measured using BET from about 1 $m^2/g$ to about 500 $m^2/g$, about 15 $m^2/g$ to 30 $m^2/g$, or about 20 $m^2/g$. In some embodiments, the obtained $WO_3$ may be heated from about 200° C. to about 700° C. or about 300° C. to about 500° C.

In some embodiments, a photocatalyst can be doped with at least one naturally occurring element e.g. non-noble gas elements. Doped elements can be provided as precursors added generally during synthesis. Doped elements can be elements that are incorporated into the crystal lattice of the Ti or W compound, for example as substituted within defined positions within the crystal lattice or otherwise interstitially included within the crystal. In some embodiments, the dopant can be selected from one of more elements including alkali metals like Li, Na, K, Cs; alkali earth metals like Mg, Ca, Sr, Ba; transition metals like Fe, Cu, Zn, V, Ti (for W-based compounds), W (for Ti-based compounds), Mo, Zr, Nb, Cr, Co, and Ni; lanthanide and actinide metals; halogens; Group III elements (from the Dmitri Mendeleev/Lothar Meyer style modern periodic table with elements arranged according to increasing atomic number) including B, Al, Ga, In and Tl, Group IV elements including Ca, Si, Ge, Sn; Group V elements like N, P, Bi; and Group VI elements like S and Se. In some embodiments, the photocatalyst can be doped with at least one element selected from C, N, S, F, Sn, Zn, Mn, Al, Se, Nb, Ni, Zr, Ce and Fe. In some embodiments, the photocatalyst may be self-doped, e.g., $Ti^{3+}$ in place of $Ti^{4+}$ in a $TiO_2$ matrix. Details of suitably doped photocatalytic materials are presented in the U.S. Provisional Patent Application No. 61/587,889, which is hereby incorporated by reference in its entirety.

In some embodiments, the photocatalytic material can be comprise one or more of n-type UV photocatalytic material, n-type visible light photocatalytic material, p-type UV photocatalytic material and/or p-type visible photocatalytic material. In some embodiments, the n-type visible band gap semiconductors can optionally be $WO_3$. In some embodiments, the n-type UV photocatalytic material can optionally be $TiO_2$.

In some embodiments, the photocatalyst can be loaded with at least one metal. Loaded elements can be provided by post synthesis methodologies like impregnation (Liu, M., Qiu, X., Miyauchi, M., and Hashimoto, K., Cu(II) Oxide Amorphous Nanoclusters Grafted $Ti^{3+}$ Self-Doped $TiO_2$: An Efficient Visible Light Photocatalyst. Chemistry of Materials, published online 2011), photoreduction (Abe et al., Journal of the American Chemical Society, 130(25): 7780-7781, 2008), and sputtering. As a preferred embodiment, loading metals on photocatalysts may be carried out as described in US Patent Publication Number US2008/0241542 which is incorporated here in its entirety by reference. In some embodiments, the loaded element is selected from noble elements. In some embodiments, the loaded element can be selected from at least one noble element, oxide, and/or hydroxide. In some embodiments, the noble elements can be selected from Au, Ag, Pt, Pd, Ir, Ru, Rh or their oxides and/or hydroxides. In some embodiments, the loaded element is selected from transition metals, their oxides and/or hydroxides. In some embodiments, the loaded element is selected from Fe and Cu and Ni or their oxide and hydroxides. In some embodiments, the loaded elements may be chosen from different groups of elements including at least one transition metal and at least one noble metal or their respective oxides and hydroxides.

A co-catalyst includes a material that enhances the photocatalytic properties of a photocatalyst. Co-catalysts may also be generically referred to as T-Binder throughout this document. In some embodiments, a co-catalyst may improve catalytic performance. For example a co-catalyst may increase a rate of catalysis by at least about 1.2, at least about 1.5, at least about 1.8, at least about 2, at least about 3, or at least about 5. One method of quantifying rate of catalysis may include determining a rate of decomposition of an organic compound, such as acetaldehyde. For example, if the concentration of acetaldehyde were photocatalytically decreased to 80% of its original value after 1 hour, or by 20%, an increase in the rate of catalysis of about 2 would result in the amount of acetaldehyde being decreased to 60% of its original value after 1 hour, or by 40%. A rate of catalysis may be measured as a decrease in a compound such as acetaldehyde due to composition, at a given time point, such as about 0.5 hours, 1 hour, 1.5 hours, 2 hours, 2.5 hours, 3 hours, or 5 hours after the photocatalysis is initiated.

Some co-catalyst may be compounds or semiconductors that are capable of being reduced by electron transfer from the conduction band of the photocatalyst. For example, a co-catalyst may have a conduction band having a lower energy than the conduction band of the photocatalyst, or a co-catalyst may have a lowest unoccupied molecular orbital having a lower energy than the conduction band of the photocatalyst. When a term such as "lower energy" and "higher energy" is used to compare a band of a semiconductor or a molecular orbital with another band or molecular orbital, it means that an electron loses energy when it is transferred to the band or molecular orbital of lower energy, and an electron gains energy when it is transferred to the band for molecular orbital of higher energy.

It is believed that some metal oxides that are co-catalysts are capable of reducing $O_2$. For example, it is believed that $CeO_2$ can reduce $O_2$ gas by electron transfer. In doing so, it is believed that $Ce^{3+}$ transfers an electron to $O_2$ and is converted to $Ce^{4+}$ as a result. In a photocatalytic composition, a photocatalyst may transfer an electron to $CeO_2$, thus converting $Ce^{4+}$ to $Ce^{3+}$, and the $Ce^{3+}$ may then reduce $O_2$. $Ce^{3+}$ may also be present as a result of equilibrium processes involving $CeO_2$ and $O_2$, and superoxide radical ion. $O_2$ and superoxide radical ion in such an equilibrium process may be adsorbed to the surface of solid $CeO_2$ or present in the atmosphere. $Ce^{3+}$ may also be present as a result of oxidation and reduction reactions with cerium species of different oxidation states that may be added intentionally or present as impurities.

Some co-catalysts may be capable of converting atmospheric $O_2$ to superoxide radical ion. For example, $CeO_2$ is capable of converting atmospheric oxygen to superoxide radical ion. It is believed that some of the equilibrium and/or electron transfer processes described above may contribute to this property of $CeO_2$. Such a conversion may occur under a variety of conditions, such as ambient conditions, including for example, normal atmospheric oxygen concentrations, such as molar concentrations of about 10% to about 30%, about 15% to about 25%, or about 20% oxygen; ambient temperature, such as about 0 degree C. to about 1000 degree C., about 0 degree C. to about 100 degree C., about 10 degree C. to about 50 degree C., or about 20 degree C. to about 30 degree C.; and pressure, such as about 0.5 atm to about 2 atm, about 0.8 atm to about 1.2 atm, or about 1 atm. Such a conversion may also occur under elevated or reduced temperature, pressure, or oxygen concentration. Other materials that may be capable of reducing $O_2$ or converting atmospheric $O_2$ to superoxide radical ion include various other materials such as $Ce_xZr_yO_2$ (where x:y=0.99-0.01), $BaYMn_2O_{5+\delta}$, and lanthanide-doped $CeO_2$ including $Ce_xZr_yLa_zO_2$, $Ce_xZr_yPr_zO_2$, and $Ce_xSm_yO_2$.

In some embodiments, the co-catalyst can be inorganic. In some embodiments, the inorganic co-catalyst can be a binder. In some embodiments, the co-catalyst can be an oxide, such as a metal dioxide, including $CeO_2$, $TiO_2$, or the like.

In some embodiments, the co-catalyst can comprise $CeO_2$. In some embodiments, the co-catalyst can comprise at least $CeO_2$. In some embodiments, the co-catalyst can be the same material as the adsorbent material. In some embodiments, the co-catalyst can be $ZrO_2$. In some embodiments, the co-catalyst can be a second material aside from $ZrO_2$. In some embodiments, the second material can comprise $CeO_2$. In some embodiments, the co-catalyst comprises anatase $TiO_2$, rutile $TiO_2$, a combination of anatase and rutile $TiO_2$, or $CeO_2$. In some embodiments, the co-catalyst comprises $TiO_2$. In some embodiments, the co-catalyst comprises anatase $TiO_2$. In some embodiments, the co-catalyst does not include $Cr_2O_3$, $CeO_2$, $Al_2O_3$, or $SiO_2$. In some embodiments, the co-catalyst does not include $Cr_2O_3$. In some embodiments, the co-catalyst does not include $CeO_2$. In some embodiments, the co-catalyst does not include $Al_2O_3$. In some embodiments, the co-catalyst does not include $SiO_2$.

In some embodiments, the co-catalyst can be $Re_rE_sO_s$, $Re_rE_tO$, or $Re_rE_tO_2$, wherein in Re is a rare earth element, E is an element or a combination of elements, and O is oxygen; and r is 1 to 2, such as about 1 to about 1.5 or about 1.5 to about 2; s is 2 to 3, such as about 1 or about 2; and t is 0 to 3, such as about 0.01 to about 1, about 1 to about 2, or about 2 to about 3. In some embodiments, the co-catalyst can be $Re_rO_s$ where Re can be a rare earth metal and r can be greater than or equal to 1 and less than or equal to 2, or can be between 1 and 2 and s can be greater than or equal to 2 and less than or equal to 3 or can be between 2 and 3. Examples of suitable rare earth elements include scandium, yttrium and the lanthanide and actinide series elements. Lanthanide elements include elements with atomic numbers 57 through 71. Actinide elements include elements with atomic numbers 89 through 103. In some embodiments, the co-catalyst can be $Ce_xZr_yO_2$ wherein the y/x ratio=0.001 to 0.999. In some embodiments, the co-catalyst can include cerium, such as a cerium oxide including a cerium oxide having a +1, +2, +3, +4, +5, or +6 oxidation state or formal charge, or an average oxidation state or formal charge of about +1 to about +6, about +2 to about +4, about +1 to about +2, or about +4 to about +6. In some embodiments, the co-catalyst can be $CeO_a$ (a is 2 or less). In some embodiments, the co-catalyst can be CeO. In some embodiments, the co-catalyst can be cerium oxide ($CeO_2$).

In some embodiments, the co-catalyst is $CeO_2$ doped with Sn, such as about 1 molar % to about 50 molar %, about 5 molar % to about 15 molar %, or about molar 10% Sn, based upon the total number of moles of co-catalyst.

In some embodiments, the photocatalyst can be $WO_3$ and the co-catalyst can be $CeO_a$ (a is 2 or less).

In some embodiments, the co-catalyst maybe a Keggin unit e.g. ammonium phospho-molybdate $((NH_4)_3[PMo_{12}O_{40}])$, 12-phosphotungstic acid, silicotungstic acid and phosphomolybdic acid. The overall stability of the Keggin unit allows the metals in the anion to be readily reduced. Depending on the solvent, acidity of the solution and the charge on the α-Keggin anion, it can be reversibly reduced in one- or multiple electron step.

In some embodiments, the photocatalytic compound can include an adsorbent material. In some embodiments, the adsorbent material can be a trimethylamine adsorbent material. In some embodiments, the adsorbent material is a solid acid and/or solid base, wherein examples of the solid acid include $ZrO_2$, and examples of the solid base include activated carbon and/or $Al_2O_3$.

In some embodiments, the adsorbent material comprises a functional group comprising oxygen. In some embodiments, the adsorbent material can comprise a Bronsted base. In some embodiments, the trimethylamine can be a Bronsted acid. In some embodiments, the adsorbent can donate a proton to trimethylamine. In some embodiments, the resulting adsorbent and trimethylamine can interact ionically.

In some embodiments, the $ZrO_2$ can be a sol. In some embodiments, adding and/or mixing the absorbent with the photocatalyst can be adding and/or mixing a Zr sol to the photocatalyst. In some embodiments, $ZrO_2$ can have a particle size of about 10-20, for example 15 nm. In some embodiments, $ZrO_2$ can have a BET of about 70 $m^2/g$. While not wanting to be limited by theory, it is believed that this large surface area can have more OH groups on the surface and/or the proton donating capacity can be more for $ZrO_2$.

In some embodiments, the photocatalytic layer can be formed of the materials described herein.

While not wanting to be limited by theory, the inventors believe that $CeO_2$ may be useful in conjunction with tungsten oxide because of the relative band positions of these materials. Furthermore, it is noteworthy that the index of refraction of $CeO_2$ is substantially the same as tungsten oxide, about 90% to about 110%. In another embodiment about 95% to about 105%. In some embodiments, the high transparency of the photocatalytic compositions can provide a composition/layer/element of transparency greater than about 50%, 60%, 65% and/or 70%. The low scattering losses due to matched refractive indices contributes directly to a transparent composition.

Any useful ratio of photocatalyst to co-catalyst may be used. In some embodiments, a photocatalytic composition may have a molar ratio (photocatalyst:co-catalyst) of about 1:5 to about 5:1, about 1:3 to about 3:1, about 1:2 to about 2:1, or about 1:1. Photocatalytic composition having such a molar ratio is useful for removing basic gas such as trymethylamine and/or acidic gas such as acetic acid.

Any useful ratio of photocatalyst to co-catalyst to adsorbent may be used. In some embodiments, a photocatalytic composition may have a molar ratio (photocatalyst and/or co-catalyst:adsorbent) of about 1:0.25 (1 mole photocatalytic and/or co-catalyst material to about 0.25 mole adsorbent material) to about 5:1 (1 mole photocatalytic and/or co-catalyst material to about 5 mole adsorbent material), about 1:3 (1 mole photocatalytic and/or co-catalyst material to about 3 mole adsorbent material) to about 3:1 (3 mole photocatalytic and/or co-catalyst material to about 1 mole adsorbent material), about 1:2 (1 mole photocatalytic and/or co-catalyst material to about 2 mole adsorbent material) to about 2:1 (2 mole photocatalytic and/or co-catalyst material to about 1 mole adsorbent material), e.g., 1:0.5 (1 mole photocatalytic and/or co-catalyst material to about 0.5 mole adsorbent material) and/or 1:1.6 (1 mole photocatalytic and/or co-catalyst material to about 1.6 mole adsorbent material).

In some embodiments, a composition can comprise tungsten oxide and a rare earth oxide at a molar ratio of about 0.5:1 to 2:1 or about 1:1 (tungsten oxide:rare earth oxide). In some embodiments, the rare earth oxide is cerium oxide ($CeO_2$). In some embodiments, the photocatalytic composition may include $WO_3$ and $CeO_2$, having a molar ratio ($WO_3:CeO_2$) of about 1:5 to about 5:1, about 1:3 to about 3:1, about 1:2 to about 2:1, or about 1:1.

FIG. 1A is a schematic representation of the structure of some embodiments of elements described herein. A photocatalytic composition 100 is formed of a photocatalyst material 102 and a trimethylamine adsorbent material 104. The adsorbent activity of the trimethylamine adsorbent material can occur in the dark. Light waves 106 can be emitted from a source 108 external to photocatalytic composition 100 in a direction through it to effect photocatalytic activity. In some embodiments, a photocatalytic element is provided, the element comprising the aforementioned photocatalytic composition 100. In some embodiments, the element can be a layer. In some embodiments, the element can be a coating disposed over a substrate.

FIG. 1B is a schematic representation of the structure of some embodiments of elements described herein. A photocatalytic composition 100 is formed of a photocatalyst material 102, a co-catalyst material 103 and a trimethylamine adsorbent material 104. The adsorbent activity of the trimethylamine adsorbent material can occur in the dark. Light waves 106 can be emitted from a source 108 external to photocatalytic composition 100 in a direction through it to effect photocatalytic activity. In some embodiments, a photocatalytic element is provided, the element comprising the aforementioned photocatalytic composition 100. In some embodiments, the element can be a layer. In some embodiments, the element can be a coating disposed over a substrate.

In some embodiments, the source 108 may be photocatalytic composition 100 including at least one of photoluminescent (phosphorescent or fluorescent), incandescent, electro- or chemo- or sono- or mechano- or thermo-luminescent materials. Phosphorescent materials may include ZnS and aluminum silicate whereas fluorescent materials may include phosphors like YAG-Ce, $Y_2O_3$—Eu, various organic dyes etc. Incandescent materials may include carbon, tungsten while electroluminescent materials may include ZnS, InP, GaN, etc. It will be evident to one of ordinary skill in the art that any other kind of light generation mechanism would suffice for providing the energy to initiate photocatalysis e.g. sunlight, fluorescent lamp, incandescent lamp, light-emitting diode (LED) based lighting, sodium vapor lamp, halogen lamp, mercury vapor lamp, noble gas discharges, and flames.

FIG. 2A is a schematic representation of a system 200 of some embodiments of the elements described herein. In some embodiments, a photocatalytic element 202 is provided including a substrate 204 and photocatalytic composition 100, the composition including at least one photocatalyst material 102 and a trimethylamine adsorbent material 104 contacting, at least in part, substrate 204. In some embodiments, photocatalytic composition 100 can be applied to or disposed upon substrate 204, at least a portion of photocatalytic composition 100 contacting surface 206 of substrate 204 or a portion thereof. In some embodiments, photocatalyst material 102 and a trimethylamine adsorbent material 104 can have refractive indices within about 0.75, about 0.50, about 0.20, or about 0.05 of each other. For example, in one embodiment, where the at least one photocatalyst material 102 can be $WO_3$, co-catalyst can be $CeO_2$, and the trimethylamine adsorbent material 104 can be zirconium dioxide, the respective refractive indices are 2.20, 2.36 and 2.16.

FIG. 2B is a schematic representation of a system 200 of some embodiments of the elements described herein. In some embodiments, a photocatalytic element 202 is provided including a substrate 204 and photocatalytic composition 100, the composition including at least one photocatalyst material 102, a co-catalyst material 103 and a trimethylamine adsorbent material 104 contacting, at least in part, substrate 204. In some embodiments, photocatalytic composition 100 can be applied to or disposed upon substrate 204, at least a portion of photocatalytic composition 100 contacting surface 206 of substrate 204 or a portion thereof. In some embodiments, photocatalyst material 102 and a trimethylamine adsorbent material 104 can have refractive indices within about 0.75, about 0.50, about 0.20, or about 0.05 of each other. For example, in one embodiment, where the at least one photocatalyst material 102 can be $WO_3$, co-catalyst 103 can be $CeO_2$, and the trimethylamine adsorbent material 104 can be zirconium dioxide, the respective refractive indices are 2.20, 2.36 and 2.16.

In some embodiments, the photocatalytic composition is coated to a substrate in such a way that the photocatalytic composition can come into contact with light and material to be decomposed.

By being disposed upon the substrate, the photocatalytic composition can be a separately formed layer, formed prior to disposition upon the substrate. In another embodiment, the photocatalytic composition 100 can be formed upon the substrate surface, e.g., by vapor deposition like either chemical vapor deposition (CVD) or physical vapor deposition (PVD); laminating, pressing, rolling, soaking, melting, gluing, sol-gel deposition, spin coating; dip coating; bar coating; slot coating; brush coating; sputtering; thermal spraying including flame spray, plasma spray (DC or RF); high velocity oxy-fuel spray (HVOF) atomic layer deposition (ALD); cold spraying or aerosol deposition. In another embodiment, the photocatalytic composition can be incorporated into the surface of the substrate, e.g., at least partially embedded within the surface.

In some embodiments, the photocatalytic composition substantially covers the substrate 204. In some embodiment, the photocatalytic composition contacts or covers at least about 75%, at least about 85%, or at least about 95% of the substrate surface 206.

A larger surface area may translate into higher photocatalytic activity. In one embodiment, the Brunner Emmett Teller BET specific surface area of the photocatalyst is between 0.1-500 $m^2/g$. In another embodiment, the BET specific surface area of the photocatalyst is between 10-50 $m^2/g$.

In another embodiment, a photocatalytic layer is provided including the aforementioned compositions of tungsten oxide to rare earth oxide.

In another embodiment, there is a method for making a photocatalytic composition including creating a dispersion comprising a photocatalyst, $CeO_2$, and a dispersing media, wherein the respective photocatalyst and $CeO_2$ refractive indices are within at least 0.75 of each other, the molar ratio of the photocatalyst to $CeO_2$ being between 1-99 molar % photocatalyst and 99-1 molar % $CeO_2$; wherein the dispersion has about 2-50 wt % solid materials; applying the dispersion to a substrate; and heating the dispersion and the substrate at a sufficient temperature and length of time to evaporate substantially all the dispersing media from the dispersion. In some embodiments, the dispersion is applied to cover the substrate, either in whole or in part, or to a surface of the substrate to create a coating or surface layer.

In another embodiment, there is a method for making a photocatalytic composition including mixing an aqueous dispersion of a visible light photocatalyst and $CeO_2$, the ratio of the photocatalyst to $CeO_2$ being between 40-60 molar % photocatalyst and 60-40 molar % $CeO_2$; adding sufficient dispersing media, e.g. water, to attain a dispersion of about 10-30 wt % solid materials; applying the dispersion to a substrate; and heating the substrate at a sufficient temperature and length of time to evaporate substantially all the water from the dispersion and the substrate. In some embodiments the $CeO_2$ can be a sol. In some embodiments, the photocatalyst material is added to the $CeO_2$ sol. In some embodiments, the $CeO_2$ is added to a photocatalyst dispersion. In some embodiments, both the photocatalyst dispersion and $CeO_2$ sol or dispersion are prepared separately and then mixed together to create the dispersion.

In another embodiment, there is a method for making a photocatalytic layer comprising including creating a dispersion comprising a photocatalyst, $CeO_2$, and a dispersing media, the molar ratio of the photocatalyst to $CeO_2$ to adsorbent being between 20-50 molar % photocatalyst and 20-50 molar % $CeO_2$ and 5-60 molar % adsorbent material; applying the dispersion to a substrate; and heating the dispersion and the substrate at a sufficient temperature and length of time to evaporate substantially all the dispersing media from the dispersion.

In another embodiment, there is a method for making a photocatalytic layer comprising including creating a dispersion comprising a photocatalyst, $CeO_2$, and a dispersing media, the molar ratio of the photocatalyst to adsorbent being between 20-80 molar % photocatalyst and 80-20 molar % adsorbent material; applying the dispersion to a substrate; and heating the dispersion and the substrate at a sufficient temperature and length of time to evaporate substantially all the dispersing media from the dispersion.

In another embodiment, the ratio of the photocatalyst, e.g., $WO_3$, to co-catalyst, e.g., $CeO_2$, may be about 2:3 to about 3:2, such as between 40-60 molar % photocatalyst and 60-40 molar % $CeO_2$. In another embodiment, the ratio of photocatalyst to $CeO_2$ is about 1:1 [50 molar % to 50 molar %]. In some embodiments, the $CeO_2$ is a sol.

In another embodiment, the amount of dispersing media, e.g. water, added is sufficient to attain a dispersion of about 2-50 wt %, about 10-30 wt %, about 15-25 wt % solid materials. In another embodiment, the amount of dispersing media, e.g., water, added is sufficient to attain a dispersion of about 20 wt % solid materials In another embodiment, the mixture covered substrate is heated at a sufficient temperature and/or sufficient length of time to substantially remove the dispersing media. In some embodiments at least 90%, at least 95%, at least 99% of the dispersing media is removed. In another embodiment, the dispersion covered substrate is heated at a temperature between about room temperature and 500° C. In another embodiment, the dispersion covered substrate is heated to a temperature between about 90° C. and about 150° C. In another embodiment, the dispersion covered substrate is heated to a temperature of about 120° C. While not wanting to be limited by theory, it is believed that keeping the temperature below 500° C. may reduce the possibility of thermal deactivation of the photocatalytic material, for example due to photocatalytic material phase change to a less active phase (highly-active anatase $TiO_2$ to less active rutile), dopant diffusion, dopant inactivation, loaded material decomposition or coagulation (reduction in total active surface area).

In another embodiment, the dispersion covered substrate is heated for a time between about 10 seconds and about 2 hours. In another embodiment, the mixture covered substrate is heated for a time of about 1 hour.

The dispersions described herein can be applied to virtually any substrate. Other methods of applying the dispersion to a substrate can include slot/dip/spin coating, brushing, rolling, soaking, melting, gluing, or spraying the dispersion on a substrate. A proper propellant can be used to spray a dispersion onto a substrate.

In some embodiments, the substrate need not be capable of transmitting light. For example, the substrate may be a common industrial or household surface on which a dispersion can be directly applied. Substrates can include, glass (e.g., windows, mirrors), walls (e.g., drywall), floors, joinery, stone (e.g., granite counter tops, flooring), masonry (e.g., brick walls), metals (e.g. stainless steel, metal alloys [handles, handrails, faucets]), natural fibers (e.g., cellulose, cotton), woods (e.g., furniture, fencing, shutters), resin materials (plastics) such as polypropylenes (PP), polyethylenes (e.g., polyethylene [PE], polyethylene terephthalates (PET), polytetrafluoroethylenes (PTFE)), polyvinylidene fluorides, polyimides and polyamide-imides, perfluoralkoxy polymer resins, fluorinated ethylene propylene (FEP), ethylene tetrafluoroethylene (ETFE) (e.g. plastic wrap for flowers, plastic handles, plastic keyboards elements), other polymeric surfaces, ceramics (e.g., porcelains [bathtubs, ceramic tiles, sinks, shower stalls, toilets]), other organic substrates (e.g., activated carbon), and the like. Exemplary items having such substrate surfaces include, but are not limited to, textiles, filters, refrigerators, air conditioners (including the ducting), vacuum cleaners, dishwashers, lighting, humidifiers, dehumidifiers, mobile phones, plasma displays, liquid crystal displays, touch panels, touch screens, fluid storage containers, fuel tanks, motor vehicle interior surfaces, Dispersions in such embodiments can be formulated as paints, liquid adhesives, on tape, on wallpapers, on drapes, on lamp shades, on light covers, on table, floor or counter surface coverings, and the like.

In some embodiments, the substrate can be porous PTFE (High-efficiency particulate absorption [HEPA]/ULPA Filter), other HEPA (e.g., those removing 99.97% of particles that have a size of 0.3 microns or larger) or HEPA like filters, non-woven or woven textile, a folding filter (Textile, paper, porous plastic as such as Porous PTFE), Glass/quartz wool, fiber (cellulose, glass quartz, plastics, resins), honeycomb structured cellulose, polymer, metal or ceramic, activated or porous carbon, zeolites (microporous aluminosilicates), or any existing filter materials. Incidentally, in an embodiment, the honeycomb structured cellulose possesses hollow portions, and the particles of the photocatalytic composition are adhered (loaded) on the surface of the inner wall of the honeycomb structured cellulose. In some embodiments, the substrate can have a minimum efficiency reporting value of 1-4 (American Society of Heating, Refrigeration & Air conditioning Engineers [ASHREAC]). In some embodiments, the substrate and the photocatalytic composition, e.g. a photocatalyst and a co-catalyst, can be in a vacuum cleaner. For example, the substrate could be vacuum cleaner filter, and could have the photocatalyst and co-catalyst coated on the filter. The vacuum cleaner can further comprise a light source, such as a UV light source, that can be used to expose the photocatalytic composition to the light.

In some embodiments, the substrate comprises ceramic. The ceramic substrate can comprise $Al_2O_3$, $ZrO_2$, $SiO_2$, Mullite ($3Al_2O_3.2SiO_3$), Cordierite (($Mg,Fe)_2Al_4Si_5O_{18}$), or other known ceramic materials. In some embodiments the ceramic element comprises $Al_2O_3$. In some embodiments the ceramic element comprises $ZrO_2$. In some embodiments the ceramic element comprises $SiO_2$. In some embodiments the ceramic element comprises Mullite ($3Al_2O_3.2SiO_3$). In some embodiments the ceramic element comprises Cordierite. In some embodiments, the ceramic comprises other ceramic materials known in the art.

In some embodiments, the substrate comprises porous ceramic. In some embodiments, the porous ceramic may have interconnected pores. This may ensure that the photocatalytic composition can cover the whole surface of the porous ceramic and air can flow through the photocatalytic-coated ceramic. In addition, the form of porous ceramics is not restricted to those prepared by porous template. Any other porous ceramic such as honeycomb etc. can also be used as a substrate.

In some embodiments, the ceramic substrate can have porosity in the range of about 1 pores per inch (ppi) to about 100 ppi. In some embodiments, the element has a porosity of about 1 ppi to about 100 ppi. In some embodiments, the element has a porosity of about 5 ppi to about 95 ppi. In some embodiments, the element has a porosity of about 10 ppi to about 90 ppi. In some embodiments, the element has a porosity of about 15 ppi to about 85 ppi. In some embodiments, the element has a porosity of about 20 ppi to about 80 ppi. In some embodiments, the element has a porosity of about 25 ppi to about 75 ppi. In some embodiments, the element has a porosity of about 30 ppi to about 70 ppi. In some embodiments, the element has a porosity of about 35 ppi to about 65 ppi. In some embodiments, the element has a porosity of about 40 ppi to about 60 ppi. In some embodiments, the element has a porosity of about 45 ppi to about 55 ppi. In some embodiments, the element has a porosity of about 50 ppi. In some embodiments the element has a porosity comprising any combination of the aforementioned ranges.

In some embodiments, the ceramic substrate can range in thickness from about 1 mm to about 50 mm. In some embodiments, the element is about 1 mm thick to about 5 mm thick. In some embodiments, the element is about 5 mm thick to about 10 mm thick. In some embodiments, the element is about 10 mm thick to about 15 mm thick. In some embodiments, the element is about 15 mm thick to about 20 mm thick. In some embodiments, the element is about 20 mm thick to about 25 mm thick. In some embodiments, the element is about 25 mm thick to about 30 mm thick. In some embodiments, the element is about 30 mm thick to about 35 mm thick. In some embodiments, the element is about 35 mm thick to about 40 mm thick. In some embodiments, the element is about 40 mm thick to about 45 mm thick. In some embodiments, the element is about 45 mm thick to about 50 mm thick.

In some embodiments, a commercially available porous ceramics may be used as the substrate. In some embodiments, the photocatalytic composition is loaded onto a porous ceramic substrate by dip coating.

In some embodiments, the photocatalytic composition may be formed into a suspension for loading onto a ceramic substrate. In some embodiments, the suspension can comprise a binder, an organic solvent and a photocatalytic material. In some embodiments, the binder can be a silicon polymer. Suitable, coatings and methods for performing the same are described in U.S. Provisional Application 61/899,423, filed Nov. 4, 2013, which is incorporated by reference in its entirety. In some embodiments, tungsten trioxide powder may be mixed with colloidal $CeO_2$ and diluted with ultra-pure water to proper viscosity for loading on porous ceramics by impregnation. Commercially available tungsten trioxide powder with a median particle size below 1 micrometer may be used. Colloidal $CeO_2$ is available from commercial products which contain solid $CeO_2$ of about 20 wt %. Ultra-pure water for dilution has an electrical resistivity of 18.2 Mohm-cm, such as MilliQ water. The formulation of photocatalytic composition suspension may be adjusted so that the molar ratio of $WO_3$ to $CeO_2$ is about one to one (50 molar % to 50 molar %), and total solid content in the suspension was of 20 wt %. A homogeneous loading suspension may be obtained by dispensed the constituents in glass vial in sonication bath and then mixing with sonication horn probe.

Loading of photocatalytic composition on porous ceramics may be carried out by impregnating the porous ceramics carrier with the photocatalytic composition suspension. A thin layer of photocatalytic composition may be formed on the surface of pores in the ceramic by different ways, for example, by dip coating or spinning the suspension-impregnated porous ceramics to avoid formation of blocked pores by the suspension. The coated porous ceramics may be dried at 120 degree C. for 1 hr and then annealed at 400 degree C. in ambient atmosphere for 1 hr to increase the adhesion of the photocatalytic composition to the substrate.

In some embodiments, loading of the photocatalytic composition suspension can be done by applying the suspension with a pipette onto the porous ceramic and then spinning the loaded ceramic in a spin coater to remove extra suspension and achieve a uniform coating thickness of the photocatalytic composition.

In some embodiments, the substrate comprises a thin film, like those used for wrapping flower arrangements. The film may be, but need not be, gas (ethylene) permeable. Additionally, the film may be, but need not be, transparent. The film may be made of low density polyethylene (LDPE), high density polyethylene (HDPE), polypropylene (PP), polyvinyl chloride (PVC), polyethylene terephthalate (PET), polyethylene terephthalate glycol-modified (PETG), Nylon 6, ionomer, nitrile rubber modified acrylonitrile-methyl acrylate copolymer, or cellulose acetate. In some embodiments, the photocatalytic composition may be disposed on the thin film substrate, e.g., by vapor deposition like physical vapor deposition (PVD); laminating, pressing, rolling, soaking, gluing, sol-gel deposition, spin coating; dip coating; bar coating; slot coating; brush coating; sputtering; atomic layer deposition (ALD); cold spraying or aerosol deposition. In some embodiments, the photocatalytic composition can be incorporated into the surface of the substrate, e.g., at least partially embedded within the surface.

In some embodiments the thin film has a thickness between about 10 microns and 250 microns or thicker. In some embodiments the film has a thickness of between about 10 microns and about 30 microns. In some embodiments the film has a thickness of between about 30 microns and about 50 microns. In some embodiments the film has a thickness of between about 50 microns and about 70 microns. In some embodiments the film has a thickness of between about 70 microns and about 90 microns. In some embodiments the film has a thickness of between about 90 microns and about 110 microns. In some embodiments the film has a thickness of between about 110 microns and about 130 microns. In some embodiments the film has a thickness of between about 130 microns and about 150 microns. In some embodiments the film has a thickness of between about 150 microns and about 170 microns. In some embodiments the film has a thickness of between about 170 microns and about 190 microns. In some embodiments the film has a thickness of between about 190 microns and about 210 microns. In some embodiments the film has a thickness of between about 210 microns and about 230 microns. In some embodiments the film has a thickness of between about 230 microns and about 250 microns.

In some embodiments, the substrate comprises glass. The substrate may be a silicate or polycarbonate glass, or other glass typically used for glass fibers, windows and/or displays, for example, the sides and door of a reach-in case for a retail flower display. In some embodiments, the glass substrate comprises a vase for storing or displaying flowers. In some embodiments, the glass substrate comprises a plurality of glass fibers. In some embodiments, the glass substrate comprises a plurality of non-woven glass fibers. In some embodiments, the glass substrate comprises a glass felt material, e.g., "E-glass" glass felt (Fibre Glast Developments Corp., Brookville, Ohio, USA). The glass substrate may comprise other glass known in the art. The photocatalytic composition may be formed upon the glass substrate, e.g., by vapor deposition like either chemical vapor deposition (CVD) or physical vapor deposition (PVD); laminating, pressing, rolling, soaking, melting, gluing, sol-gel deposition, spin coating; dip coating; bar coating; slot coating; brush coating; sputtering; thermal spraying including flame spray, plasma spray (DC or RF); high velocity oxy-fuel spray (HVOF) atomic layer deposition (ALD); cold spraying or aerosol deposition. In another embodiment, the photocatalytic composition can be incorporated into the surface of the substrate, e.g., at least partially embedded within the surface.

In some embodiments, the system may further comprise at least one additional filter element, the additional filter element being without a photocatalytic compound. In some embodiments, the system may further comprise at least one additional filtering element. In some embodiments, the additional filtering element is a size excluding element. In some embodiments, the additional filtering element can exclude materials between 20 nm and 5 mm, between 50 nm and 10 microns, particles less than 2.5 microns in diameter. In some embodiments, the additional filtering element can be an ionic element, wherein the filtering can exclude or reduce the amount of ionically charged material passing therethrough.

In some embodiments the at least one additional filtering element can comprise a prefilter element. In some embodiments, the at least one additional filtering element can comprise a HEPA/ULPA filter. In some embodiments, the at least one additional filtering element can comprise activated carbon. In some embodiments, the at least one additional filtering element can comprise a combination of any or all of the prefilter element, the HEPA/ULPA filter, the activated carbon filter and/or any other filtering material or substrate. In some embodiments, the additional filters can be in the order of prefilter, hepa filter, activated carbon filter and then photocatalytic filter.

In some embodiments, the at least one additional filter can comprise a prefilter element. In some embodiments, the prefilter filter element provides an initial size exclusion filtering function. The size exclusion can be, for example, between 20 nm and 5 mm, between 50 nm and 10 microns, particles less than 2.5 microns in diameter. In some embodiments, the prefilter element can comprise paper, non woven materials (metal strands, glass fibers, cellulose fibers, polymeric filters/foam materials). In some embodiments the prefilter element is positioned before the photocatalytic filter element, to receive the air flow from the environment prior to the photocatalytic filter element. In some embodiments, the one additional filter element can be a substrate over which the photocatalytic composition is disposed.

In some embodiments, the at least one additional filter element can be a HEPA filter. In some embodiments, the HEPA filter provides additional size exclusion filtering function. The size exclusion can be, as previously described, as those removing 99.97% of particles that have a size of 0.3 microns or larger. In some embodiments, the HEPA filter can comprise PTFE.

In some embodiments, the at least one additional filter can comprise activated carbon. Active carbons (R 1) are made in particulate form as powders or fine granules less than 1.0 mm in size with an average diameter between 0.15 mm and 0.25 mm. In some embodiments, the active carbons can provide a large surface to volume ratio with a small diffusion distance. In some embodiments, powdered activate carbon can be crushed or ground carbon particles, 95-100% of which will pass through a designated mesh sieve. Activated carbon can be an R1 activated carbon. In some embodiments the activated carbon particles can be sized to be retained on a 50-mesh sieve (0.297 mm) and/or smaller. In some embodiments, the activated carbon particle can be retained on an 80-mesh sieve (0.177 mm) and smaller.

In some embodiments, the activated carbon filter comprises granular activated carbon. In some embodiments, the activated carbon can be extruded activated carbon. In some embodiments, granular activated carbon can be sized selected from 8×20, 20×40, or 8×30. In some embodiments, the granular activated carbon can be at least sized 4×6, 4×8 and/or 4×10. A 20×40 carbon is made of particles that will pass through a U.S. Standard Mesh Size No. 20 sieve (0.84 mm) (generally specified as 85% passing) but be retained on a U.S. Standard Mesh Size No. 40 sieve (0.42 mm) (generally specified as 95% retained). AWWA (1992) B604 uses the 50-mesh sieve (0.297 mm) as the minimum GAC size.

A photocatalytic composition may be capable of adsorbing an organic compound, such as an tertiary amine. A photocatalytic composition may be capable of photocatalytically decomposing an organic compound, such as an tertiary amine. In some embodiments the tertiary amine can be trimethylamine. In some embodiments, the photocatalytic composition may be capable of adsorbing at least 35 ppm, 40 ppm, 50 ppm of TMA per about 0.5 mMole of adsorbent.

A photocatalytic composition may be capable of photocatalytically decomposing an organic compound, such as an tertiary amine. In some embodiments the tertiary amine can be trimethylamine. In some embodiments, the photocatalyst can decompose the trimethylamine into carbon dioxide ($CO_2$), water and nitrogen ($N_2$ gas).

$$1TMA+10.5O_2 \rightarrow 3CO_2+4.5H_2O+0.5N_2(g)$$

Thus the appearance of $CO_2$ in the mixture after contacting a TMA containing gas mixture with the photocatalytic material and exposing the material to blue light, e.g., about 455 nm, can indicate photocatalytic decomposition of TMA into the constituent gas/compositions.

A photocatalytic composition may be capable of photocatalytically decomposing an organic compound, such as an aldehyde, including acetaldehyde formaldehyde, propionaldehyde, etc.; a hydrocarbon, such as an alkane, including methane, ethane, propane, butane, etc.; an aromatic hydrocarbon, such as benzene, naphthalene, anthracene, etc.; crude oil, or fraction thereof; dyes such as anthocyanins, methylene blue, basic blue 41; volatile organic compounds, such as methane, ethane, propane, butane, benzene, toluene, acetone, diethyl ether, methanol, ethanol, isopropyl alcohol, formaldehyde, ethyl acetate, xylene, etc.; $NO_x$, such as NO, $NO_2$, $N_2O$, HONO, $SO_x$, such as $SO_2$, $SO_3$, etc.; CO, $O_3$; etc., small organic molecules such as caffeine, diclofenac, ibuprofen, geosmin, flumequine, etc., bacteria such as *Escherichia coli, Staphylococcus aureus*, Acinetobactor, *Pseudomonas aeruginosa* etc., virus such as MS2, influenza, norovirus, etc., bacterial spores such as *Clostridium difficile*, protozoa such as Giardia, etc., and fungi such as *Candida*, etc. Photocatalytic decomposition may occur in a solid, liquid, or a gas phase.

In some embodiments, a use of the above-mentioned photocatalytic composition, or the above-mentioned photocatalytic layer is described, wherein the photocatalytic composition or the photocatalytic layer is used for removing basic gas and/or acidic gas. In some embodiments, the basic gas comprises trymethylamine. In some embodiments, the acidic gas comprises acetic acid.

To test the photocatalytic ability of a photocatalytic composition, gas-phase decomposition of trimethylamine was used. A photocatalyst sample is dispersed in water or other solvent including methanol or ethanol. A binder may be added to this dispersion in such a way as to produce a final dispersion with 10-50% solid content. The dispersed sample can be homogenized using an ultrasonic probe. The dispersion can then be applied on a substrate. The substrate-applied dispersion combination can then be heated to about 120° C., thereby evaporating substantially all of the dispersant. Thereafter it can be subjected to high intensity UV illumination for about one hour for producing a pristine photocatalyst surface.

This photocatalytic composition/substrate can be placed in a Tedlar Bag (5 L) which can then be filled with about 3 L air from a compressed air source. Thereafter, acetaldehyde from a calibration-grade source can be added to achieve a final acetaldehyde concentration of about 80 ppm as measured using a calibrated gas chromatograph equipped with a high sensitivity flame ionization detector (GC-FID).

This gas bag sample can be equilibrated in the dark for about an hour and gas chromatography and flame ionization detection (GC-FID) can be used to confirm a stable concentration of acetaldehyde. A monochromatic blue light-emitting diode array (455 nm) with 200 mW/cm² intensity of illumination at the exposure plane can be then used to irradiate the bag. Gas samples can be collected from the bag using an automated system and analyzed using the GC-FID. Temporal variation of the concentration of acetaldehyde can be determined from the area under the corresponding peak of the chromatogram. Other suitable gas detection scheme like Gastec gas detection tubes may also be used for determining the acetaldehyde concentration in the bag.

The gas decomposition rate (%) can be set as a value calculated based on formula $[(X-Y)/X \times 100]$, where X represents a gas concentration before light irradiation and Y represents a gas concentration when the gas concentrations are measured.

In one embodiment, the acetaldehyde decomposition rate provided by the desired level of photocatalytic activity is at least about 10% in about 1 hour with above-mentioned illumination. In a preferred embodiment, the decomposition rate is at least about 30% in about 1 hour. In a more preferred embodiment, the rate is 50% in about 1 hour. In another embodiment, the decomposition rate is at least about 80% in about 1 hour.

In one embodiment, a photocatalyst material contains the photocatalyst powder according to the embodiment whose content falls within a range of not less than 0.1 molar % nor more than 99 molar %. In another embodiment, a photocatalyst coating material contains the photocatalyst material according to the embodiment whose content falls within a range of not less than 1 molar % nor more than 90 molar %.

The photocatalyst material, compositions, and dispersions described herein can be used as a disinfectant, an odor eliminator, a pollutant eliminator, a self-cleaner, an antimicrobial agent and the like. The materials, compositions, and dispersions can be used to interact with air, liquid, microbial and/or solid substances. In one embodiment, they can be used to clean air such as in confined environments such as in aircraft fuselages or in more contaminated environments such as auto garages. In other embodiments, they can be used for antimicrobial properties such as to coat surfaces in need of disinfection such as food service or production facilities or hospitals or clinics. In other embodiments, they can be used for removing basic gas such as trymethylamine and/or acidic gas such as acetic acid. Specifically, they can be suitably used for deodorization of refrigerator and the like.

In some embodiments, methods are utilized wherein polluted air is exposed to light and a photocatalyst material, composition, or dispersion as described herein thereby removing pollutants from the air.

In some embodiments, light and a photocatalyst material, composition, or dispersion can remove about 50%, about 60%, about 70%, about 80%, about 90%, about 95% or more of the pollution in the air.

In another embodiment, methods are utilized wherein polluted water is exposed to light and a photocatalyst material, composition, or dispersion as described herein thereby reducing the amount of contaminant in the water.

In some embodiments, light and a photocatalyst material, composition, or dispersion can remove about 50%, about 60%, about 70%, about 80%, about 90%, about 95% or more of the pollution from the water.

In other embodiments, methods are utilized wherein biological contaminants are exposed to light and a photocatalyst material, composition, or dispersion as described herein thereby disinfecting the biological material. In some embodiments, biological materials can include food products.

In some embodiments, light and a photocatalyst material, composition, or dispersion can remove about 50%, about 60%, about 70%, about 80%, about 90%, about 95% or more of the contamination from the biological material in the air.

The following is a listing of embodiments that are specifically contemplated herein.

EXAMPLES

Sample Preparation

All materials were used without further purification unless otherwise indicated. All materials were purchased from Sigma Aldrich (St. Louis, Mo., USA) unless otherwise indicated.

Example 1

$WO_3$ photocatalyst (200 mg), as prepared according to the method described U.S. patent application Ser. No. 13/738,243, filed Jan. 10, 2013, (Published as United States Patent Application Publication, 2013/0180,932, published Jul. 18, 2013), was added to water. The resulting dispersion was then added to 740 mg of $CeO_2$ sol (Nissan Chemical NanoUse CE-20B). The mole ratio of $CeO_2$ and $WO_3$ was chosen to be 1:1 (50 molar % to 50 molar %). Then a sufficient amount of RO (reverse osmosis treated) water (800 mg) was added to the resulting dispersion in order to make a coating solution which is about 20 wt % solid materials in water. The resulting dispersion was homogenized using an ultrasonic homogenizer. A glass substrate (50 mm×75 mm) was coated with the prepared resultant by using a spin coater (1200 rpm/40 sec). The coated substrate was heated for about 2 minutes at about 120° C. The resulting coated substrate was transparent (about 86% at about 555 nm). Photocatalytic activity was determined by monitoring the acetaldehyde degradation ratio to about 81% after 1 hour of blue light-emitting diode (LED) (455 nm, 200 mW/cm$^2$) irradiation.

Example 2

Coated substrate 2 was made in a similar manner to Example 1, except that $SiO_2$ sol (Nissan Chemical SNOWTEX O, 258 mg) was added instead of $CeO_2$ sol. The resulting coated substrate was transparent (90% at about 555 nm). Photocatalytic activity as determined by the acetaldehyde degradation ratio was about 50% after irradiation under conditions similar to Example 1.

Example 3

Coated substrate 3 was made in a similar manner to Example 1, except that $SiO_2$ sol (Nissan-Chemical SNOWTEX 20 L, 258 mg) was added instead of $CeO_2$ sol. The resulting obtained substrate was transparent (91% at 555 nm). Photocatalytic activity as determined by the acetaldehyde degradation ratio was about 67% after irradiation under conditions similar to Example 1.

Comparative Example 1

Comparative Example 1 was prepared in a manner similar to Example 1, except that silicone resin (Shin-Etsu Chemical, SCR-1012) was used instead of $CeO_2$ sol. The ratio of $WO_3$ was about 20 wt % in silicone resin. Glass substrate (50 mm×75 mm) was coated with the prepared solution by doctor blade. After 120° C. heating for curing, the obtained substrate was translucent. The resulting obtained substrate exhibited a transparency of about 75% at 555 nm. Photocatalytic activity as determined by the acetaldehyde degradation ratio was about 1% after irradiation under conditions similar to Example 1.

Comparative Example 2

Comparative Example 2 was prepared in a manner similar to Example 1, except that poly (methyl methacrylate) (PMMA) was dispersed in acetone. The ratio of $WO_3$ was about 20 wt % in PMMA and no water was added. Glass substrate (50 mm×75 mm) was coated with the prepared solution by doctor blade. After 120° C. heating for curing, the obtained substrate was translucent. The resulting obtained substrate exhibited a transparency of about 78% at 555 nm. The acetaldehyde degradation ratio was 0.5% after irradiation under conditions similar to Example 1.

Comparative Example 3

$WO_3$ (0.8 g) was added to $Al_2O_3$ sol (Nissan Chemical Alumina-Sol200, 5 g). The mole ratio of $Al_2O_3$ and $WO_3$ was chosen to be 1:1 by weight. Then RO water (5.8 g) was added in order to make a coating solution which is 14 wt % solid materials in water. A glass substrate (50 mm×75 mm) was coated with the prepared solution by using a spin coater (1200 rpm/40 sec). After heating at about 120° C. for evaporation of the liquid, the obtained substrate was translucent. The resulting obtained substrate was transparent (91% at 555 nm). The acetaldehyde degradation ratio was about 0% after irradiation under conditions similar to Example 1.

Example 4

30 mL of 5 mM Tungstic acid ($WO_3.H_2O$) and 30 mL of HF2% solution (e.g., $WO_3$ precursor), were added to 40 ml of boric acid ($H_3BO_3$). Two 75 mm×25 mm silicon wafers were immersed in the resulting solution and stirred for about 6 hours at about 30 degree C. The layered substrate was removed from the solution and annealed at about 400 degree C. for about 1 hour resulting in a coated glass slide (Example 4). A coating solution was prepared with sufficient $CeO_2$ sol (Nissan Chemical NanoUse CE-20B) to attain a mole ratio of $CeO_2$ and $WO_3$ of about 1:1 (50 molar % to 50 molar %). Example 4a was then made by spin coating the substrate of Example 4, as discussed above, with the $CeO_2$ coating solution in a manner similar to that described in Example 1.

The spin coated glass slides prepared in accordance with Example 4 and 4a above, were heated at about 120 degree C. on a hot plate under full spectrum irradiation by a Xe lamp (lamp power output about 300 W) for about 1 hour. Each slide was then sealed in a separate 5 L Tedlar bag under vacuum, followed by injecting about 3 L of ambient air and about 80 mL of 3500 ppm acetaldehyde. Each bag was lightly massaged for about 2 minutes by hand then placed in the dark for about 15 min. The acetaldehyde concentration was estimated by Gas Chromotagraphy-Flame Ionization Detector (GC-FID) to be at 80±2 ppm. Each Tedlar bag containing a sample was placed back in the dark for about 1 hour. The slide/Tedlar bag was exposed to array blue LED of 455 nm with light intensity of 50 mW/cm². A sample was collected every 30 minutes by an automated injection port of GC-FID and the amount of remaining acetaldehyde was estimated at subsequent 30 minute intervals. FIG. 3 is a graph illustrating T-binder performance data. The graph shows that generally when a T-binder ($CeO_2$) is combined with $WO_3$, performance is improved when compared to bare $WO_3$.

Examples 5-7

5 g of $WO_3$ (Global Tungsten & Powder, Towanda, Pa., USA [GTP]) was added to high purity alumina ball mill jars containing about 50 g of $ZrO_2$ balls of about 3 mm in diameter and was ground by ball mill (SFM-1 model Desktop Planetary Ball Miller (MTI Corp. location) in 25 mL methanol for about 4 hours to obtain ground $WO_3$ (GTP) with a smaller particle size. Plasma-$WO_3$ was made in a manner similar to that described in U.S. Pat. No. 8,003,563, which is hereby incorporated by reference in its entirety.

Additional glass slides were made and placed in a Tedlar bag in a similar manner to that described in Example 4, except that 200 mg each of $WO_3$ (GTP) (Example 5 w/, Example 5a w/out), Ground $WO_3$ (GTP) (Example 6 w/, Example 6a w/out) and plasma-$WO_3$ (Example 7 w/, Example 7a w/out) each with and without $CeO_2$ were spin-coated on glass substrate instead of LPD-$WO_3$. When $CeO_2$ was used, the molar ratio of each type of $WO_3$ to $CeO_2$ was 1:1.

The spin-coated slides $WO_3$, Ground $WO_3$, find and plasma-$WO_3$ each with and without $CeO_2$ were prepared and were tested for acetylaldehyde degradation as described in Example 4. The results are shown in FIG. 4.

Examples 8A-8J

In another example (Example 8), additional slides were made in a manner similar to that of Example 1, except that the amount of $CeO_2$ sol added was varied to attain different molar ratios of $WO_3$:$CeO_2$ (e.g., 0%, 0.1%, 5%, 10%, 30%, 50%, 75%, 90%, 95%, 100%) ((100−x) $WO_3$+(x) T-binder). FIG. 5 shows the acetaldehyde degradation estimated after 1 hour of exposure to 270 mW/cm² blue LED array light.

Examples 9-15

In another example (Example 9), an additional slide was made in the following manner: plasma $WO_3$ powder (130 mg) and $CeO_2$ powder (96.5 mg) (about a 1:1 mole ratio) were dispersed first in RO water (20 wt % of solid) and bath sonicated (VWR B3500A-MT) for about 10 minutes and then probe sonicated (Sonic dismembrator Model 100, continuous mode) for about 5 minutes. Then, the mixture/composite/blend was spin coated on a 75 mm×50 mm glass slide and annealed as described in Example 4.

Additional slides were made in a similar manner, except that various other materials were used instead of $CeO_2$, as set forth in Table 1.

TABLE 1

| Example | Plasma $WO_3$ | T binder Material |
|---|---|---|
| 9 | 130 mg | Aldrich $CeO_2$ = 96.5 mg |
| 10 | 130 mg | Anatase $TiO_2$ = 44.78 mg |
| 11 | 130 mg | $KTaO_3$ = 150.3 mg |
| 12 | 130 mg | $KNbO_3$ = 100.93 mg |
| 13 | 130 mg | $SrTiO_3$ = 102.89 mg |
| 14 | 130 mg | SiC = 22.5 mg |
| 15 | 130 mg | $TiO_2$ = 44.78 mg and $CeO_2$ = 96.5 mg |

Each glass slide was tested for acetylaldehyde degradation in a manner similar to that described in Example 4, except that the applied light intensity was about 270 mW/cm². The results are shown in FIG. 6.

In another example, each glass slide made above was tested in a manner similar to that described immediately above, except that each slide was exposed to varied light intensity (from about 50 mW/cm² to about 350 mW/cm²). The results are shown in FIG. 7.

Examples 16-30

In addition, in another example, about 130 mg of powdered sample from various compounds (see Table 2) were each separately dissolved in a minimal amount of RO water and homogenized for about 5 minutes. The compounds were then combined with $WO_3$ in a 1:1 molar ratio according to the process described in Example 1.

TABLE 2

| | Example | | | | | | | |
|---|---|---|---|---|---|---|---|---|
| | 16 | 17 | 18 | 19 | 20 | 21 | 22 | 23 |
| compound | CuO | MoO$_3$ | MnO$_3$ | Y$_2$O$_3$ | Gd$_2$O$_3$ | CeO$_2$-combustion | Plasma WO$_3$ | Nb$_2$O$_5$ |

| | Example | | | | | | |
|---|---|---|---|---|---|---|---|
| | 24 | 25 | 26 | 27 | 28 | 29 | 30 |
| compound | In$_2$O$_3$ | Ta$_2$O$_5$ | Rutile + Anatase TiO$_2$ | CeO$_2$ (Nippon) | CeO$_2$ (Aldrich) | Plasma CeO$_2$ | Anatase TiO$_2$ anatase |

A clean petri dish was wiped with ethanol and the inside surface of the dish was ionized with a corona device for about 1 to 2 minutes. The homogeneous sample of each compound was poured into the treated petri dish and then heated at about 120 degree C. while swirling to achieve uniform distribution of the sample as it dried. After the sample had dried, the petri dish was placed under a UV lamp (300 W) for about 1 hour. The petri dish was then inserted into a Tedlar bag and tested in a manner similar to that described for Example 4. The results are shown in FIG. 8.

Examples 31-35

In another example, 3.78 g of Tin (II) 2-ethylhexanoate also known as tin (II) octoate and/or stannous octoate] (Spectrum Chemicals, Gardena, Calif., USA), 5 g of Ce(NO$_3$)$_3$·6H$_2$O (Sigma Aldrich, St. Louis, Mo., USA), and 3.0 g of ammonium nitrate (NH$_4$NO$_3$) (Sigma Aldrich, St. Louis, Mo., USA) were dissolved in about 25 mL of RO treated water. 1.129 g maleic hydrazide was then added just before the mixture was heated to about 150 degree C. and stirred for about 20 minutes.

The resultant precursor mixture was then heated at about 450 degree C. for about 40 minutes in a preheated muffle furnace under ambient atmosphere and pressure conditions. The resultant powder was annealed at about 500 degree C. for about 20 minutes. The resultant powder was mixed with WO$_3$ in a 1:1 molar ratio used in a manner similar to that described in Example 1 to make a coated glass slide and then was tested on its ability to degrade acetylaldehyde following the procedure described in Example 4.

Other powders were made in a similar manner, except that the amounts, of materials and/or other parameters were used as set forth in Table 3.

TABLE 3

Combustion synthesis of Tin doped and undoped CeO$_2$

| Nominal Composition | Precursors amount | Combustion temperature | Annealing temperature |
|---|---|---|---|
| Example 31 [7.5 mol % Sn in CeO$_2$] | Ce(NO$_3$)$_3$·6H$_2$O = 5 g<br>Sn octoate = 0.378 g<br>NH$_4$NO$_3$ = 3 g<br>Maleic Hydrazide = 1.129 g | 450° C. | 500° C./ 20 min |
| Example 32 [5 mol % Sn in CeO$_2$] | Ce(NO$_3$)$_3$·6H$_2$O = 5 g<br>Sn octoate - 0.245 g<br>NH$_4$NO$_3$ = 3 g<br>Maleic Hydrazide = 1.127 g | 450° C. | 500° C./ 20 min |
| Example 33 [2.5 mol % Sn in CeO$_2$] | Ce(NO$_3$)$_3$·6H$_2$O - 5 g<br>Sn octoate = 0.1196 g<br>NH$_4$NO$_3$ = 3 g<br>Maleic Hydrazide = 1.129 g | 450° C. | 500° C./ 20 min |
| Example 34 [0 mol % Sn in CeO$_2$] | Ce(NO$_3$)$_3$·6H$_2$O = 5 g<br>Maleic Hydrazide = 1.129 g | 450° C. | 500° C./ 20 min |
| Example 35 [0 mol % Sn in CeO$_2$] | Ce(NO$_3$)$_3$·6H$_2$O = 5 g<br>Maleic Hydrazide = 1.129 g | 300° C. | — |

The combustion synthesized powders were incorporated in a similar manner onto a glass slide as described in Example 3 and was tested as described in Example 4. The results are shown in FIG. 9. As seen in FIG. 9, WO$_3$ combined with Sn doped CeO$_2$ showed enhanced acetaldehyde degradation as compared with WO$_3$ combined with undoped CeO$_2$.

Example 36: Combination of Combustion Ti(O,C,N)$_2$:Sn and Plasma CeO$_2$ Towards Acetaldehyde Degradation In another example, Ti(O,C,N)$_2$:Sn was combined with plasma CeO$_2$ powder (1:1 mole ratio) in a similar manner to that described in Example 1, except that Ti(O,C,N)$_2$:Sn powder was used instead of WO$_3$ powder, and was spin coated on a glass micro slide as described in Example 1. The Ti(O,C,N)$_2$:Sn was synthesized as described in co-pending U.S. Patent Provisional Application Ser. No. 61/608,754, filed Mar. 8, 2012, which is hereby incorporated by reference in its entirety, by an aqueous combustion method employing glycine (1.4 g) as a completely decomposable fuel in addition to titanium (IV) bis ammonium lactate dihydroxide (7 mL of 50 wt % aqueous solution), tin octoate (0.883 g) and ammonium nitrate (3.5 g) at 300 degree C. followed by annealing at 400 degree C. for 30 min in the box furnace. A glass slide made in a manner similar to that of the previous examples was tested for acetaldehyde degradation as also earlier described in Example 4 (at 270 mW/cm$^2$ light intensity). 7% acetaldehyde degradation was observed after 5 hours of exposure for the Ti(O,C,N)$_2$:Sn photocatalyst coated glass slide in a Tedlar bag. When, a glass slide with both Ti(O,C,N)$_2$:Sn and CeO$_2$ (1:1 mole ratio) was tested in a Tedlar bag in a similar manner, the acetaldehyde degradation increased to 22% after 5 hours of exposure.

Examples 37-38/Comparative Example 4: WO₃/CeO₂/ZrO₂

WO₃ Preparation 5 g of WO₃ (Nanostructured & Amorphous Materials Inc [NA], Houston, Tex., USA) was added to high purity alumina ball mill jars containing about 50 g of ZrO₂ balls of about 3 mm in diameter and was ground by ball mill (SFM-1 model Desktop Planetary Ball Miller [MTI Corp., Richmond, Calif., USA]) in 25 mL methanol for about 18 hours to obtain ground WO₃ (NA) with a smaller particle size and then annealed at about 400 degree C. for about 5 hr.

Sample Preparation (Petridish)

Example 37

65 mg of processed NA WO₃ was added into a 20 ml glass vial together with 216 mg colloidal ZrO₂ (ZR-30BF, Nissan Chemicals) and 369 mg of ultrapurified water (passed through 370 μl pore filter from MilliQ, (EMD Millipore, Billerica, Mass. USA) water. The molar ratio of NA WO₃ to ZrO₂ was about 1 mole NA WO₃ (34.7%) to about 1.88 moles ZrO₂ (65.3%). The solid content of colloidal ZrO₂ was 30 wt %. The solid content of total dispersion WO₃/ZrO₂ was 20 wt %. The mixture was first dispersed by placing in a sonication bath for 5 min. A uniform coating of the photocatalytic composition suspension (WO₃) was obtained by mixing the suspension with sonication probe for 10 min.

A clean petri dish was wiped with ethanol and the inside surface of the dish was ionized with a corona device for about 1 to 2 minutes. The homogeneous sonicated sample of each compound described above (Examples 37, Example 38 and Comparative Example 4) was poured into the treated petri dish and then heated at about 120 degree C. while swirling to achieve uniform distribution of the sample as it dried. After the sample had dried, the petri dish was placed under a UV lamp (300 W) for about 1 hour. The petri dish was then inserted into a Tedlar bag for testing.

Example 38 was prepared similar manner to Example 37. 43 mg of processed WO₃, 43 mg of CeO₂ (Richest) and 43 mg of ZrO₂ (solid) was added.

Comparative Example 4 was prepared similar manner to Example 37. 43 mg of processed WO₃, 43 mg of CeO₂ (Richest) and 43 mg of Zeolite (SigmaAldrich) was added.

Examples 37-38 and Comparative Example 3 are summarized in Table 4.

Testing

Each petridish was then sealed in a separate 5 L Tedlar bag under vacuum, followed by injecting about 3 L of ambient air and about 150 mL of 2000 ppm trimethylamine under a dark environment. The trimethylamine concentration was estimated by detection tube (Gastec) at time 0H and 2H. Examples 37 and 38 which contained ZrO₂ adsorbed trimethylamine (about 63 ppm and about 72 ppm respectfully) under dark conditions. Comparative Example 4 which contained Zeolite instead of ZrO₂ adsorbed a lesser amount of trimethylamine (about 50 ppm) under dark conditions. The blank filter containing no ZrO₂ nor any WO₃ did not apparently adsorb any trimethylamine (about 50 ppm) under dark conditions. These results are summarized in Table 5.

TABLE 4

| Sample | Pcat | | Adsorbent |
|---|---|---|---|
| Example 37 | WO₃ 65 mg | | ZrO₂ 65 mg |
| Example 38 | WO₃ 43 mg | CeO₂ 43 mg | ZrO₂ 43 mg |
| Comparative Example 4 | WO₃ 43 mg | CeO₂ 43 mg | Zeolite 43 mg |

TABLE 5

(Examples 37 and 38 adsorbed TMA under dark)

| | Hour | |
|---|---|---|
| | 0 H | 2 H |
| Blank | 102 ppm | 103 ppm |
| Example 37 | 73 ppm | 10 ppm |
| Example 38 | 84 ppm | 12 ppm |
| Comparative Example 4 | 83 ppm | 53 ppm |

TMA was injected several more times into each bag in order to saturate adsorbent. Then saturated bag and the respective Example was then tested photocatalytic activity.

Each Tedlar bag containing a sample was placed back in the dark for about 1 hour. Then the Tedlar bag was exposed to blue LED (455 nm) array with light intensity of 25 mW/cm². A sample was collected after 60 minutes by detection tube (No. 180 GASTEC) and CO₂ detector (EGM-4 PP SYSTEMS).

The presence or production of CO₂ could provide an indication that the photocatalytic material is degrading the TMA into CO₂, N₂ gas and water.

TABLE 6

(TMA decomposition was confirmed by CO₂ production) Pcat test 25 mW/cm²

| | | Hour | | |
|---|---|---|---|---|
| | | −1 H | 0 H | 1 H |
| Example 37 | TMA | 81 ppm | 77 ppm | 64 ppm |
| | CO₂ | 26 ppm | 23 ppm | 56 ppm |
| Example 38 | TMA | 85 ppm | 81 ppm | 60 ppm |
| | CO₂ | 21 ppm | 17 ppm | 88 ppm |

Sample Preparation (Filter)

2000 mg of processed WO₃, 1485 mg of CeO₂ and 1773 mg of ZrO₂ sol (ZR-30BF. Contain 532 mg of solid ZrO₂) were added into 14827 mg of purified water (1:1:0.5 molar ratio compositions).

2000 mg of processed WO₃, 1485 mg of CeO₂ and 5670 mg of ZrO₂ sol (ZR-30BF. Contain 1701 mg of solid ZrO₂) were added into 16775 mg of purified water (1:1:1.6 molar ratio compositions).

The mixture was first dispersed by placing in a sonication bath for 5 min. A uniform coating of the photocatalytic composition suspension was obtained by mixing the suspension with sonication probe for 10 min.

Suspension which prepared was loaded onto the porous 100 mm×50 mm×5 mm Al₂O₃ ceramic (Selee Corporation, Hendersonville, N.C., USA) by dipping the porous ceramic into a glass beaker containing the suspension and leaving it submerged for 5 minutes to allow the suspension to penetrate the porous ceramics. The 100 mm×50 mm×5 mm porous Al₂O₃ ceramic impregnated with photocatalytic composition suspension was pulled from beaker, and the extra suspension was drawn off by gravity. The photocatalytic composition loaded porous $Al_2O_3$ was first dried at ambient atmosphere at 120 degree C. for 1 hr on a hot plate to remove the water in the coating and then annealed in a box furnace in ambient atmosphere at 400 degree C. for 5 hr.

Example 39: Reducing Odor on an Airliner

A dispersion including a photocatalyst composition as described herein is provided as a coating on a thin adhesive film. This adhesive film is used to coat the ceiling of a Boeing 737. The photocatalyst composition can react with ambient light from light emitting diode light fixtures above the overhead bins to generate reactive airborne species that can reduce odor in the air.

Example 40: Disinfecting Food Preparation Surfaces

A photocatalyst resin capable of being applied as a spray is provided to a food preparation factory to coat its work surfaces. The resin can be applied in a heated or unheated state in order to properly bond with a work surface. All surfaces that are to come into contact with food in the factory are sprayed with the resin.

The factory is equipped with organic light emitting diode light fixtures for general lighting. This ambient light can react with the resin surface thereby creating oxygen radicals on the surface. These radicals can react with food contaminants thereby rendering the food safe. As a result of applying the resin to the work surfaces, instances of bacteria spreading into the food supply has reduced 50%.

Example 41: Disinfecting Refrigerator Unit

A TMA gas sample was prepared as follows. 5 ccm of 100% TMA solution (Sigma-Aldrich) was with sufficient purified air to result in a 2000 ppm/synthetic air flow.

A removal system was constructed including a plastic (polylactic acid) frame (2 inches×3 inches×4.5 inches), housing a NMB-Matt fan 24 10SB-04 W-B29 fan facing outward, immediately before about a 2.128 inch diameter round aperture. At the rear of the housing, 8 square apertures ($^{13}/_{16}$×$^{13}/_{16}$ inches) were formed in an outer grill communicating the external environment with the interior of the housing. A pair of 100 mm×50 mm×5 mm filter elements (Zr lean [1:1:0.5 molar ratio] prepared as described above, were disposed within the framework between the square apertures and the interior of the housing. In subsequent test runs, a "Zr rich" [1:1:1.6 molar ratio] prepared as described above, were disposed within the framework between the square apertures and the interior of the housing.

A Haier household refrigerator (Model Number HA ICTG30SW) with a total volume of about 10.3 cubic feet (about 7.8 cubic feet refrigerator compartment volume and 2.5 freezer volume) was modified to include an (1) external insertion port and (2) an external sampling port communicating with the interior refrigerator compartment (7.8 cubic feet), (3) a VOC monitor (VOC-TRAQ, Baseline-Mocom, Lyons, Colo., USA) was placed in the refrigerator compartment with the read-out being visible from outside the refrigerator, (4) a temperature and humidity sensor, (5) a circulating fan (NMB-MAT 4710KL-04 W-B10 (12 vlt DC/0.16 A, Minebea Motor Manufacturing Co. [NMB Technologies Corp] Chatsworth, Calif., USA), and (6) a filtering system made as described above, disposed in the interior of the refrigerator compartment.

About 550 ccm of the 2000 ppm TMA/synthetic air mixture was injected into the refrigerator described above in about a 3 minute insertion interval. During the injection, the circulating fan was left on for about 5 minutes. The TMA concentration readings (about 10 ppm by VOC monitor) were monitored for reaching a relatively constant/plateau reading, generally about 5-10 minutes. The removing filter system was then turned on and the TMA concentration was continuously monitored by the VOC monitor and the detection tube by taking samples every 15-30 minutes. Additional "runs" were performed using no PCat filter ("blank"), 1:1: 1.6 molar ratio filter (Zr-rich") and a commercial activated charcoal filter (McMaster-Carr, Robbinsville, N.J., USA) and the test rerun. The results are shown in FIG. 10. As shown in the FIG. 10, the removal filters removed TMA from the interior volume of the refrigerator.

Example 42

The same filtering element/filtering system placed within the same refrigerator system was repeated after about 2 hours from the previous test to assess the continued effectiveness of the system. The results are shown in FIG. 11.

(Experimentations Regarding Removal of Vinegar Odor by $WO_3/CeO_2$)

Sample Preparation (Filter No. 1 to Filter No 0.5)

2000 mg of processed $WO_3$, 1485 mg of $CeO_2$ and 5670 mg of $ZrO_2$ sol (ZR-30BF. Contain 1701 mg of solid $ZrO_2$) were added into 16775 mg of purified water (1:1:1.6 molar ratio compositions).

The mixture was first dispersed by placing in a sonication bath for 5 min. A uniform coating of the photocatalytic composition suspension was obtained by mixing the suspension with sonication probe for 10 min.

Suspension which prepared was loaded onto the porous 7 mm×17 mm×5 mm $Al_2O_3$ ceramic (Selee Corporation, Hendersonville, N.C., USA) by dipping the porous ceramic into a glass beaker containing the suspension and leaving it submerged for 5 minutes to allow the suspension to penetrate the porous ceramics. The 7 mm×17 mm×5 mm porous $Al_2O_3$ ceramic impregnated with photocatalytic composition suspension was pulled from beaker, and the extra suspension was drawn off by gravity. The photocatalytic composition loaded porous $Al_2O_3$ was first dried at ambient atmosphere at 120 degree C. for 1 hr on a hot plate to remove the water in the coating and then annealed in a box furnace in ambient atmosphere at 400 degree C. for 2 hr. Accordingly, a filter No. 3 was prepared.

A filter No. 1 was prepared in a same manner as the filter No. 3, except that the photocatalytic composition was not loaded on the porous ceramic, and the porous ceramic solely was used as the filter.

Further, a filter No. 2 was prepared in a same manner as the filter No. 3, except that the photocatalytic composition was prepared without using the $ZrO_2$ sol.

Furthermore, an AC filter (activated carbon) was used as the filter No. 5.

In an acrylic box having a size of 250 mm×250 mm×250 mm, a deodorant apparatus including the filter No. 1, a blue LED, and a fan was disposed under a condition with a temperature of 23 degree C. and a humidity of 45 to 60% RH.

0.11 g of vinegar (commercial product in China) was included in a filter paper and was placed on a petri dish disposed in the acrylic box. Evaluation was performed using a personal TVOC monitor FTVR-01 (FIGARO, JAPAN). The result was shown as No. 1 in Table 7 below.

Further, similar evaluation as No. 1 mentioned above was performed by using the filter No. 2 in place of the filter No. 1. The result was shown as No. 2 in Table 7 below.

Further, similar evaluation as No. 1 mentioned above was performed by using the filter No. 3 in place of the filter No. 1. The result was shown as No. 3 in Table 7 below.

Further, similar evaluation as No. 1 mentioned above was performed by using no filter. The result was shown as No. 4 in Table 7 below.

Further, similar evaluation as No. 1 mentioned above was performed by using the filter No. 5 in place of the filter No. 1. The result was shown as No. 5 in Table 7 below.

Moreover, these evaluation results are also shown in FIG. 12.

TABLE 7

| No. | Filter | P cat | $ZrO_2$ | Substrate |
| --- | --- | --- | --- | --- |
| 1 | No. 1: Ceramic foam only | Absent | Absent | $Al_2O_3$ |
| 2 | No. 2: STD-P cat (ceramic) | Present | Absent | $Al_2O_3$ |
| 3 | No. 3: $ZrO_2$-P cat (ceramic) | Present | Present | $Al_2O_3$ |
| 4 | None | Absent | Absent | Absent |
| 5 | No. 5: AC filter (activated carbon) | Absent | Absent | Absent |

(Pcat: $WO_3:CeO_2 = 1:1$)
($ZrO_2$-P cat: $WO_3:CeO_2:ZrO_2 = 1:1:1.6$)

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

The present application is based on a U.S. provisional application No. 62/168,210 filed May 29, 2015, the contents of which are incorporated herein by reference.

The invention claimed is:

1. A photocatalytic composition comprising:
   a photocatalyst comprising $WO_3$;
   a co-catalyst comprising $CeO_2$; and
   an adsorbent material.

2. The photocatalytic composition according to claim 1, wherein the adsorbent material comprises solid acid and/or solid base.

3. The photocatalytic composition according to claim 1, wherein the adsorbent material comprises at least one of $ZrO_2$, activated carbon and $Al_2O_3$.

4. The photocatalytic composition according to claim 1, where the photocatalyst is doped with at least one naturally occurring element.

5. The photocatalytic composition according to claim 1, where the photocatalyst is loaded with a transition metal, a transition metal oxide, or a transition metal hydroxide.

6. The photocatalytic composition according to claim 5, wherein the transition metal is Cu, Fe, or Ni.

7. The photocatalytic composition according to claim 1, wherein the photocatalyst is loaded with a noble metal, a noble metal oxide, or a noble metal hydroxide.

8. The photocatalytic composition according to claim 7, wherein the noble metal is Au, Ag, Pt, Pd, Ir, Ru, or Rh.

9. The photocatalytic composition according to claim 1, wherein the co-catalyst comprises a binder.

10. The photocatalytic composition according to claim 1, wherein the photocatalytic composition is capable of photocatalytically decomposing trimethylamine.

11. A photocatalytic layer comprising the photocatalytic composition according to claim 1.

12. The photocatalytic layer according to claim 11, further comprising a substrate, wherein at least a portion of the photocatalytic composition contacts the substrate surface.

13. A self cleaning material comprising the photocatalytic composition according to claim 1.

14. A method of making a photocatalytic layer, comprising forming the photocatalytic composition of claim 1; and applying the photocatalytic composition to a substrate.

15. The method according to claim 14, wherein the photocatalytic composition is applied to glass, wallboards, stone, masonry, metals, woods, plastics, other polymeric surfaces, concrete, fibers, textiles, yarns, or ceramics.

16. The method according to claim 15, wherein the photocatalytic composition is applied by vapor deposition, chemical vapor deposition, physical vapor deposition, laminating, pressing, rolling, soaking, melting, gluing, sol-gel deposition, spin coating, dip coating, bar coating, brushing coating, sputtering, thermal spraying, flame spray, plasma spray, high velocity oxy-fuel spray, atomic layer deposition, cold spraying, or aerosol deposition.

* * * * *